(12) United States Patent
Saad et al.

(10) Patent No.: US 12,423,141 B2
(45) Date of Patent: Sep. 23, 2025

(54) SYSTEM AND METHOD FOR DYNAMIC DATA PROTECTION ARCHITECTURE

(71) Applicant: Dell Products L.P., Hopkinton, MA (US)

(72) Inventors: Yossef Saad, Ganei Tikva (IL); Ravi Vijayakumar Chitloor, Bengaluru (IN); Jehuda Shemer, Kfar Saba (IL); Mahesh Kamat, San Jose, CA (US); Chegu Vinod, San Jose, CA (US); William Price Dawkins, Lakeway, TX (US)

(73) Assignee: DELL PRODUCTS L.P., Round Rock, TX (US)

(*) Notice: Subject to any disclaimer, the term of this patent is extended or adjusted under 35 U.S.C. 154(b) by 278 days.

(21) Appl. No.: 17/116,924

(22) Filed: Dec. 9, 2020

(65) Prior Publication Data

US 2022/0179701 A1   Jun. 9, 2022

(51) Int. Cl.
  *G06F 9/50* (2006.01)
  *G06F 9/54* (2006.01)
  (Continued)

(52) U.S. Cl.
  CPC .......... *G06F 9/5011* (2013.01); *G06F 9/5083* (2013.01); *G06F 9/544* (2013.01); *G06F 16/1748* (2019.01); *G06F 21/6218* (2013.01)

(58) Field of Classification Search
  CPC .. G06F 9/5011; G06F 16/1748; G06F 9/5083; G06F 21/6218; G06F 9/544;
  (Continued)

(56) References Cited

U.S. PATENT DOCUMENTS 7,478,117 B1   1/2009 Lamb et al.
7,606,892 B2   10/2009 Piet et al.
(Continued)

FOREIGN PATENT DOCUMENTS

WO   2005071552 A1   8/2005
WO   2007120772 A2   10/2007

OTHER PUBLICATIONS

Mohammadi, Nazila Gol, et al. "Towards an end-to-end architecture for run-time data protection in the cloud." 2018 44th Euromicro Conference on Software Engineering and Advanced Applications (SEAA), IEEE, pp. 514-518 (Year: 2018).*

(Continued)

*Primary Examiner* — Aimee Li
*Assistant Examiner* — Willy W Huaracha
(74) *Attorney, Agent, or Firm* — Aly Z. Dossa; Chamberlain Hrdlicka

(57) ABSTRACT

A system for providing data protection services for data hosted by composed information handling systems includes a system includes a system control processor manager. The manager obtains a data protection architecture; identifies, based on the data protection architecture, first computing resources for a first pool that provides a first set of functionalities of the data protection services; identifies, based on the data protection architecture, second computing resources for a second pool that provides a second set of functionalities of the data protection services; assigns, based on hardware components of the first computing resources, a portion of the first set of functionalities to a first portion of the first computing resources; assigns, based on the hardware components of the first computing resources, a second portion of the first set of functionalities to a second portion of the first computing resources; and instantiates, based on the assignments, the data protection architecture.

19 Claims, 15 Drawing Sheets

(51) Int. Cl.
*G06F 16/174* (2019.01)
*G06F 21/62* (2013.01)

(58) Field of Classification Search
CPC .............. G06F 11/1453; G06F 11/1464; G06F 2209/5011; G06F 11/3034; G06F 11/3433; G06F 21/6245
See application file for complete search history.

(56) References Cited

U.S. PATENT DOCUMENTS

| | | | |
|---|---|---|---|
| 7,620,984 | B2 | 11/2009 | Kallahalla |
| 8,095,929 | B1 | 1/2012 | Ji et al. |
| 8,245,053 | B2 | 8/2012 | Hoang et al. |
| 8,266,636 | B2 | 9/2012 | Kharat et al. |
| 8,276,140 | B1 | 9/2012 | Beda, III et al. |
| 8,285,747 | B1 | 10/2012 | English |
| 8,306,948 | B2 | 11/2012 | Chou |
| 8,499,066 | B1 | 7/2013 | Zhang et al. |
| 8,589,659 | B1 | 11/2013 | Shapiro |
| 8,606,920 | B1 | 12/2013 | Gupta et al. |
| 8,751,546 | B1 | 6/2014 | Grieve |
| 8,997,242 | B2 | 3/2015 | Chen |
| 9,104,844 | B2 | 8/2015 | Fang |
| 9,105,178 | B2 | 8/2015 | Carlson |
| 9,245,096 | B2 | 1/2016 | Abuelsaad |
| 9,413,819 | B1 | 8/2016 | Berg et al. |
| 9,529,689 | B2 | 12/2016 | Ferris et al. |
| 9,569,266 | B2 | 2/2017 | Chen et al. |
| 9,569,598 | B2 | 2/2017 | Abuelsaad |
| 9,600,553 | B1 | 3/2017 | Nigade et al. |
| 9,613,147 | B2 | 4/2017 | Carlson |
| 9,678,977 | B1 | 6/2017 | Aronovich |
| 9,806,979 | B1 | 10/2017 | Felstaine et al. |
| 9,898,316 | B1 | 2/2018 | Chalmer et al. |
| 9,916,200 | B2 | 3/2018 | Xu |
| 9,923,785 | B1 | 3/2018 | Li et al. |
| 9,959,140 | B2 | 5/2018 | Jackson |
| 10,091,295 | B1* | 10/2018 | Savic ................ G06F 16/25 |
| 10,097,438 | B2 | 10/2018 | Ferris et al. |
| 10,348,574 | B2 | 7/2019 | Kulkarni |
| 10,382,279 | B2 | 8/2019 | Roese |
| 10,601,903 | B2 | 3/2020 | Bivens |
| 10,628,225 | B2 | 4/2020 | Yamato |
| 10,754,741 | B1 | 8/2020 | Sethuramalingam et al. |
| 10,756,990 | B1 | 8/2020 | Chakkassery Vidyadharan et al. |
| 10,782,882 | B1 | 9/2020 | Wu |
| 10,795,856 | B1* | 10/2020 | Smith ................ G06F 16/122 |
| 10,848,408 | B2 | 11/2020 | Uriel |
| 10,860,362 | B2 | 12/2020 | Lal et al. |
| 10,860,380 | B1 | 12/2020 | Kowalski et al. |
| 10,909,072 | B2 | 2/2021 | Sun et al. |
| 10,909,283 | B1 | 2/2021 | Wang et al. |
| 10,994,198 | B1 | 5/2021 | Byskal et al. |
| 11,093,139 | B1* | 8/2021 | Karr ................ G06F 3/0685 |
| 11,119,739 | B1 | 9/2021 | Allen et al. |
| 11,133,030 | B1 | 9/2021 | Shen et al. |
| 11,134,013 | B1 | 9/2021 | Allen et al. |
| 11,221,886 | B2 | 1/2022 | Bivens et al. |
| 11,288,056 | B1 | 3/2022 | Shetty et al. |
| 11,288,102 | B2 | 3/2022 | Hamilton et al. |
| 11,308,234 | B1* | 4/2022 | Stapleton ............ G06F 21/602 |
| 11,397,739 | B2 | 7/2022 | Pfitzmann et al. |
| 11,537,421 | B1 | 12/2022 | Brooker et al. |
| 11,616,686 | B1 | 3/2023 | Chandrachood et al. |
| 2002/0188711 | A1 | 12/2002 | Meyer et al. |
| 2003/0028642 | A1 | 2/2003 | Agarwal et al. |
| 2003/0061262 | A1* | 3/2003 | Hahn ................ G06F 9/468 718/104 |
| 2003/0233427 | A1 | 12/2003 | Taguchi |
| 2004/0257998 | A1 | 12/2004 | Chu et al. |
| 2006/0082222 | A1 | 4/2006 | Pincu et al. |
| 2006/0089951 | A1 | 4/2006 | Factor et al. |
| 2006/0161884 | A1 | 7/2006 | Lubrecht et al. |
| 2006/0230407 | A1 | 10/2006 | Rosu et al. |
| 2006/0236100 | A1 | 10/2006 | Baskaran et al. |
| 2008/0052480 | A1 | 2/2008 | Satoyama et al. |
| 2008/0313476 | A1 | 12/2008 | Hansen |
| 2009/0199193 | A1 | 8/2009 | Jackson |
| 2009/0282404 | A1 | 11/2009 | Khandekar et al. |
| 2010/0138656 | A1 | 6/2010 | Chinen et al. |
| 2010/0217865 | A1* | 8/2010 | Ferris ................ H04L 47/70 709/226 |
| 2011/0055378 | A1 | 3/2011 | Ferris et al. |
| 2011/0099147 | A1 | 4/2011 | Mcalister et al. |
| 2011/0154500 | A1 | 6/2011 | Sahita et al. |
| 2011/0258248 | A1* | 10/2011 | Jackson ............ H04L 67/1001 709/202 |
| 2011/0307570 | A1 | 12/2011 | Speks |
| 2012/0047328 | A1 | 2/2012 | Williams et al. |
| 2012/0066483 | A1 | 3/2012 | Boury et al. |
| 2012/0131161 | A1 | 5/2012 | Ferris et al. |
| 2012/0221314 | A1 | 8/2012 | Bourlatchkov et al. |
| 2012/0222084 | A1 | 8/2012 | Beaty et al. |
| 2012/0226799 | A1* | 9/2012 | Kapur ................ G06F 11/3006 709/224 |
| 2013/0007710 | A1 | 1/2013 | Vedula et al. |
| 2013/0311434 | A1 | 11/2013 | Jones |
| 2013/0332901 | A1 | 12/2013 | Berg et al. |
| 2013/0346718 | A1 | 12/2013 | Meshchaninov et al. |
| 2014/0007097 | A1 | 1/2014 | Chin et al. |
| 2014/0149635 | A1 | 5/2014 | Bacher et al. |
| 2014/0165063 | A1 | 6/2014 | Shiva et al. |
| 2014/0223233 | A1 | 8/2014 | Heyrman et al. |
| 2014/0279884 | A1 | 9/2014 | Dantkale et al. |
| 2014/0282820 | A1 | 9/2014 | Walton et al. |
| 2014/0358972 | A1 | 12/2014 | Guarrieri et al. |
| 2014/0359356 | A1 | 12/2014 | Aoki |
| 2015/0058997 | A1* | 2/2015 | Lee ................ G06F 9/45558 726/26 |
| 2015/0085868 | A1 | 3/2015 | Snyder, II et al. |
| 2015/0106165 | A1 | 4/2015 | Rai et al. |
| 2015/0121394 | A1 | 4/2015 | Chen et al. |
| 2015/0178128 | A1 | 6/2015 | Knowles et al. |
| 2015/0220455 | A1 | 8/2015 | Chen et al. |
| 2015/0263890 | A1 | 9/2015 | Fall |
| 2015/0281336 | A1 | 10/2015 | Beale |
| 2015/0317173 | A1 | 11/2015 | Anglin |
| 2015/0381426 | A1 | 12/2015 | Roese et al. |
| 2016/0062441 | A1 | 3/2016 | Chou et al. |
| 2016/0103698 | A1 | 4/2016 | Yang et al. |
| 2016/0180087 | A1 | 6/2016 | Edwards et al. |
| 2016/0224903 | A1 | 8/2016 | Talathi et al. |
| 2016/0259665 | A1 | 9/2016 | Gaurav et al. |
| 2016/0275377 | A1 | 9/2016 | Mathew |
| 2017/0031622 | A1 | 2/2017 | Nagarajan et al. |
| 2017/0034012 | A1 | 2/2017 | Douglas et al. |
| 2017/0041184 | A1 | 2/2017 | Broz et al. |
| 2017/0048200 | A1 | 2/2017 | Chastain |
| 2017/0097851 | A1 | 4/2017 | Chen |
| 2017/0118247 | A1 | 4/2017 | Hussain |
| 2017/0195201 | A1 | 7/2017 | Mueller et al. |
| 2017/0201574 | A1 | 7/2017 | Luo |
| 2017/0295107 | A1 | 10/2017 | Salapura et al. |
| 2018/0024964 | A1 | 1/2018 | Mao |
| 2018/0026905 | A1 | 1/2018 | Balle et al. |
| 2018/0027067 | A1 | 1/2018 | Guim Bernat et al. |
| 2018/0063145 | A1 | 3/2018 | Cayton et al. |
| 2018/0074816 | A1 | 3/2018 | Moss et al. |
| 2018/0157429 | A1 | 6/2018 | Venkat et al. |
| 2018/0157444 | A1 | 6/2018 | Franciosi et al. |
| 2018/0246749 | A1 | 8/2018 | Van Riel et al. |
| 2018/0288503 | A1 | 10/2018 | Chayat |
| 2018/0351836 | A1 | 12/2018 | Guim Bernat et al. |
| 2019/0014193 | A1 | 1/2019 | Guim Bernat et al. |
| 2019/0065061 | A1 | 2/2019 | Kim et al. |
| 2019/0065256 | A1 | 2/2019 | Hamilton et al. |
| 2019/0079837 | A1 | 3/2019 | Agarwal et al. |
| 2019/0164087 | A1 | 5/2019 | Ghibril et al. |
| 2019/0188014 | A1 | 6/2019 | Easterling et al. |
| 2019/0190778 | A1 | 6/2019 | Easterling et al. |
| 2019/0191106 | A1 | 6/2019 | Dabral |
| 2019/0205180 | A1 | 7/2019 | Macha et al. |
| 2019/0227616 | A1 | 7/2019 | Jenne et al. |

(56) References Cited

U.S. PATENT DOCUMENTS

| | | |
|---|---|---|
| 2019/0250937 A1 | 8/2019 | Thomas |
| 2019/0281373 A1 | 9/2019 | Sadasivarao et al. |
| 2019/0324808 A1 | 10/2019 | Krishnan et al. |
| 2019/0334774 A1 | 10/2019 | Bennett et al. |
| 2019/0356729 A1 | 11/2019 | Bivens et al. |
| 2019/0356731 A1 | 11/2019 | Bivens et al. |
| 2019/0384516 A1 | 12/2019 | Bernat |
| 2019/0384648 A1 | 12/2019 | Wiggers et al. |
| 2019/0386902 A1 | 12/2019 | Mueller et al. |
| 2019/0391798 A1 | 12/2019 | Farrell |
| 2020/0026428 A1 | 1/2020 | Vithalkar |
| 2020/0026564 A1 | 1/2020 | Bahramshahry et al. |
| 2020/0028854 A1 | 1/2020 | Fabrizi et al. |
| 2020/0034221 A1 | 1/2020 | Ganesan et al. |
| 2020/0034528 A1 | 1/2020 | Yang et al. |
| 2020/0044966 A1 | 2/2020 | Krishnan et al. |
| 2020/0045116 A1 | 2/2020 | Deodhar et al. |
| 2020/0065254 A1 | 2/2020 | Cao et al. |
| 2020/0097348 A1 | 3/2020 | Mahindru |
| 2020/0097358 A1 | 3/2020 | Mahindru et al. |
| 2020/0110639 A1 | 4/2020 | Corsi et al. |
| 2020/0117831 A1 | 4/2020 | Eckhard |
| 2020/0136994 A1 | 4/2020 | Doshi |
| 2020/0174949 A1 | 6/2020 | Ramasamy et al. |
| 2020/0218561 A1 | 7/2020 | Lal et al. |
| 2020/0233582 A1 | 7/2020 | Chen et al. |
| 2020/0241798 A1 | 7/2020 | Kanno |
| 2020/0257547 A1 | 8/2020 | Oshins |
| 2020/0264998 A1 | 8/2020 | Long et al. |
| 2020/0285502 A1 | 9/2020 | Hildebrand et al. |
| 2020/0293375 A1 | 9/2020 | Klein |
| 2020/0341786 A1 | 10/2020 | Soryal |
| 2020/0341798 A1 | 10/2020 | Duleba |
| 2020/0351221 A1 | 11/2020 | Subramani et al. |
| 2020/0351347 A1* | 11/2020 | Chang ................. G06F 11/1458 |
| 2020/0356200 A1 | 11/2020 | Blanco et al. |
| 2020/0358714 A1 | 11/2020 | Singleton, IV et al. |
| 2020/0364001 A1 | 11/2020 | Bhandari et al. |
| 2020/0387321 A1 | 12/2020 | Bansal et al. |
| 2020/0401457 A1 | 12/2020 | Singhal et al. |
| 2021/0019062 A1 | 1/2021 | Fessel |
| 2021/0019162 A1 | 1/2021 | Viswanathan et al. |
| 2021/0037466 A1 | 2/2021 | Silva et al. |
| 2021/0111942 A1 | 4/2021 | Tahhan et al. |
| 2021/0117389 A1* | 4/2021 | Cui ....................... G06F 3/0641 |
| 2021/0117441 A1 | 4/2021 | Patel et al. |
| 2021/0152659 A1 | 5/2021 | Cai et al. |
| 2021/0185565 A1 | 6/2021 | Kalderen et al. |
| 2021/0224093 A1 | 7/2021 | Fu et al. |
| 2021/0233532 A1 | 7/2021 | Kudurshian et al. |
| 2021/0250220 A1 | 8/2021 | Yang et al. |
| 2021/0258265 A1 | 8/2021 | Guim Bernat |
| 2021/0286667 A1 | 9/2021 | Mgzaw et al. |
| 2021/0367901 A1 | 11/2021 | Singh et al. |
| 2021/0383020 A1 | 12/2021 | Sofia et al. |
| 2021/0397494 A1 | 12/2021 | Graham |
| 2022/0121546 A1 | 4/2022 | Chawla |
| 2022/0179701 A1 | 6/2022 | Saad et al. |
| 2022/0182288 A1 | 6/2022 | Vaikar et al. |
| 2022/0191253 A1 | 6/2022 | Rungta et al. |
| 2022/0197773 A1 | 6/2022 | Butler et al. |
| 2022/0342649 A1 | 10/2022 | Cao et al. |
| 2023/0026690 A1 | 1/2023 | Dawkins et al. |
| 2023/0033296 A1 | 2/2023 | Shetty et al. |
| 2023/0093900 A1 | 3/2023 | Scope et al. |
| 2023/0237204 A1 | 7/2023 | Khatri et al. |

OTHER PUBLICATIONS

Chunlin, Li, Tang Jianhang, and Luo Youlong. "Hybrid cloud adaptive scheduling strategy for heterogeneous workloads." Journal of Grid Computing 17, pp. 419-446. (Year: 2019).*

Anonymous: "Dell Chassis Management Controller Version 6.20 for PowerEdge M1000e" Dec. 3, 2018 (Dec. 3, 2018) 274 pages, Retrieved from the Internet: URL:https://dl/del/com/topicspdf/dell-chassis-management-controller-v620-poweredge-m1000e_users-guide_en-us.pdf.

International Searching Authority, International Search Report and Written Opinion dated Oct. 21, 2021 for corresponding PCT Application No. PCTUS2021029708 filed Apr. 28, 2021.

International Searching Authority, International Search Report and Written Opinion for corresponding PCT Application No. PCTUS2021029702 filed Apr. 28, 2021, Aug. 19, 2021, 13 pages.

International Searching Authority, International Search Report and Written Opinion mailed Jul. 19, 2021, Issued in corresponding PCT Application No. PCT/US2021/029687, 11 pages.

International Searching Authority, International Search Report and Written Opinion of corresponding PCT Application No. PCT/US2021/029698, Aug. 9, 2021, 15 pages.

Alachiotis, Nikolaos, et al. "dReDBox: A Disaggregated Architectural Perspective for Data Centers", Hardware Accelerators in Data Centers. Springer, Cham, 2019. pp. 35-56. (Year: 2019).

Mohammadi et al, "Towards an End-to-End Architecture for Runtime Data Protection in the Cloud", 2018 44th Euromicro Conference on Software Engineering and Advanced Applications (SEAA), IEEE, pp. 514-518. (Year: 2018).

International Search Report and Written Opinion of the International Searching Authority mailed Aug. 19, 2021, Issued in corresponding PCT Application No. PCT/US2021/029702 (13 pages).

International Search Report and Written Opinion of the International Searching Authority mailed Aug. 9, 2021, issued in corresponding PCT Application No. Application No. PCT/US2021/029698 (15 pages).

International Search Report and Written Opinion of the International Searching Authority mailed Jul. 19, 2021, issued in corresponding PCT Application No. PCT/US2021/029687 (11 pages).

International Search Report and Written Opinion of the International Searching Authority mailed Oct. 21, 2021, Issued in corresponding PCT Application No. PCT/US2021/029708 (12 pages).

Anna Levin et al., "Network Monitoring in Federated Cloud Environment", Year: 2017.

Mahantesh N. Birje et al., "Cloud Monitoring System: Basics, Phases and Challenges", International Journal of Recent Technology and Engineering, vol. 8, Issue 3, Sep. 2019, Year: 2019.

Richard G. Clegg et al., "On the Selection of Management/Monitoring Nodes in Highly Dynamic Networks", IEEE Transactions on Computers, vol. 62, No. 6, Jun. 2013, Year: 2013.

Francesco Paolucci et al., "Telemetry in Disaggregated Optical Networks", 2020 International Conference on Optical Network Design and Modeling (ONDM) (Year: 2020).

Marcio Barbosa De Carvalho et al., "A Cloud Monitoring Framework for Self-Configured Monitoring Slices Based on Multiple Tools", pp. 180-184 (Year: 2013).

Peter X. Gao et al., "Network Requirements for Resource Disaggregation", pp. 249-264 (Year: 2016).

Yuxin Cheng et al., "Disaggregated Data Centers: Challenges and Tradeoffs", (Year: 2020).

Dinesh Chandra Verma, Principles of Computer Systems and Network Management, IBM T.J. Watson Research Center, 27 pages, 2009.

Elisson Da Silva Rocha et al., Aggregating data center measurements for availability analysis, John Wiley & Sons Ltd., 25 pages, Jul. 20, 2020.

* cited by examiner

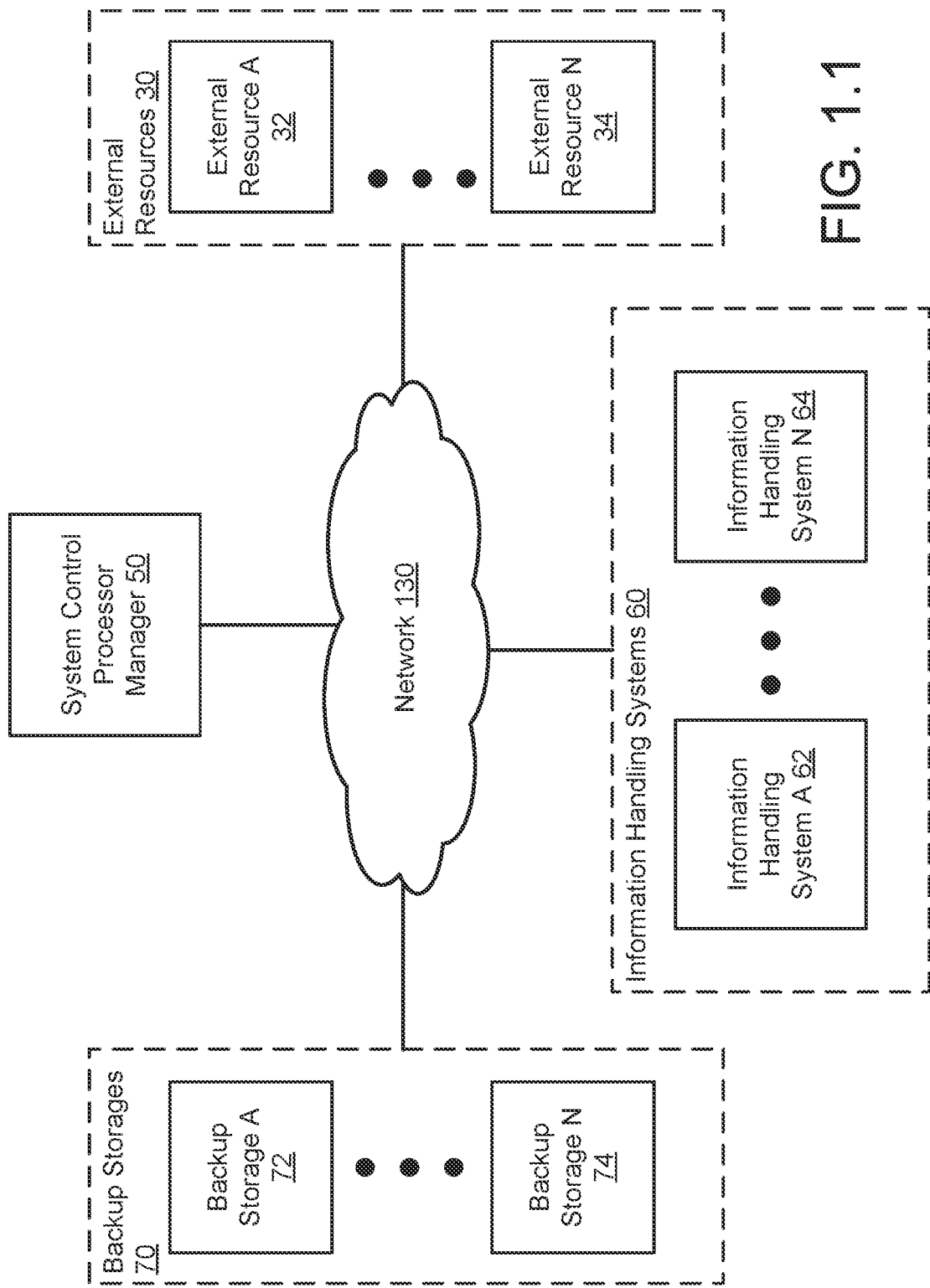
FIG. 1.1

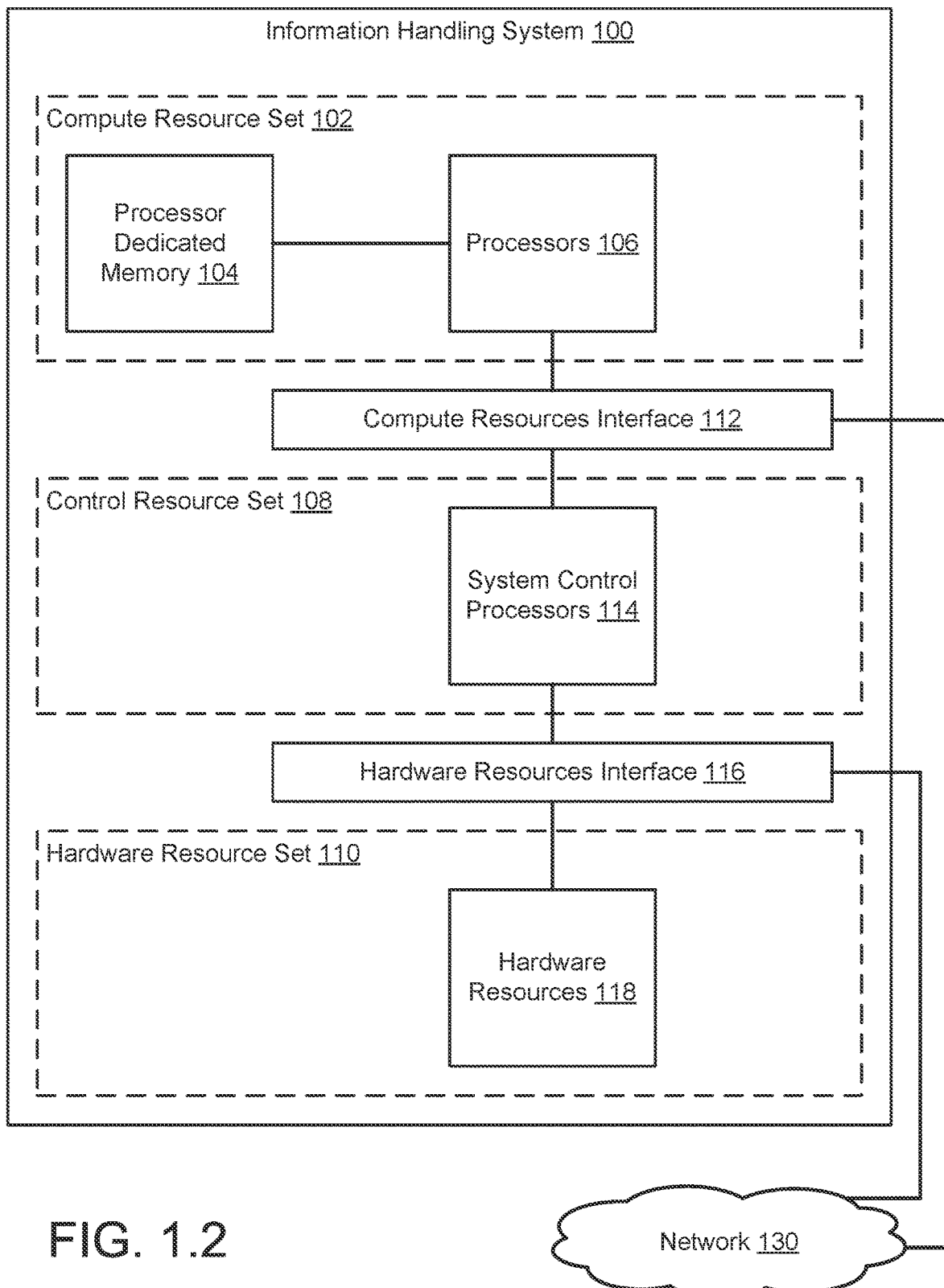
FIG. 1.2

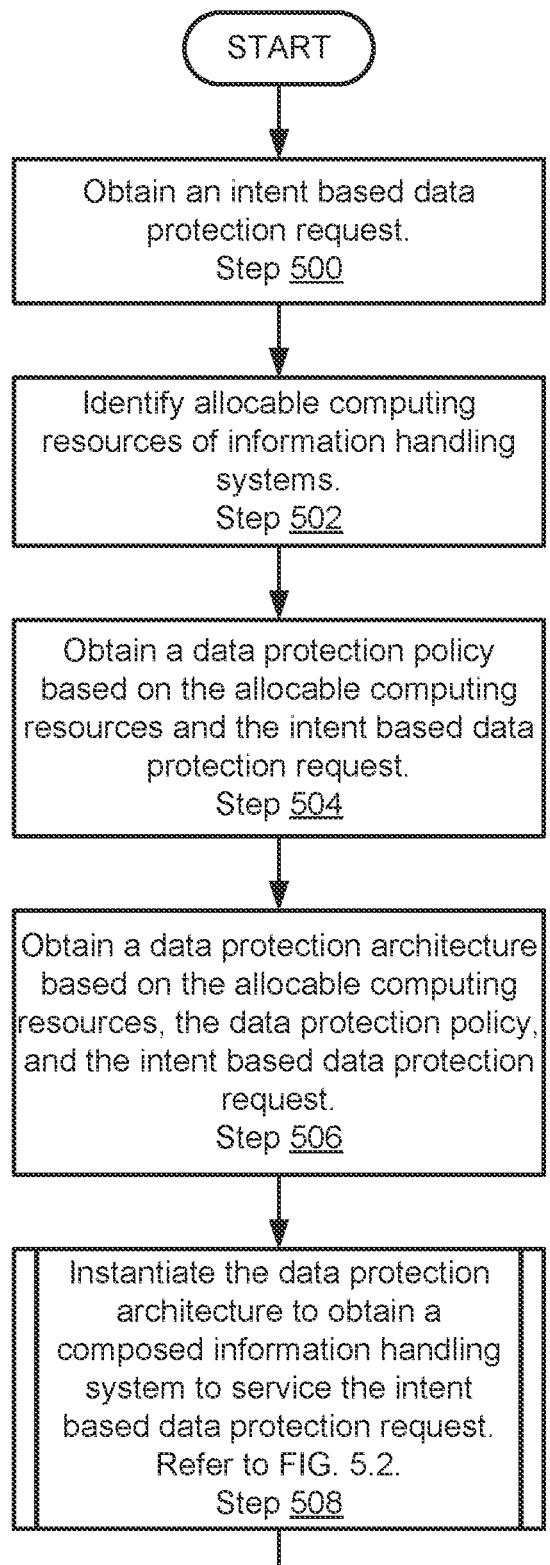
FIG. 5.1

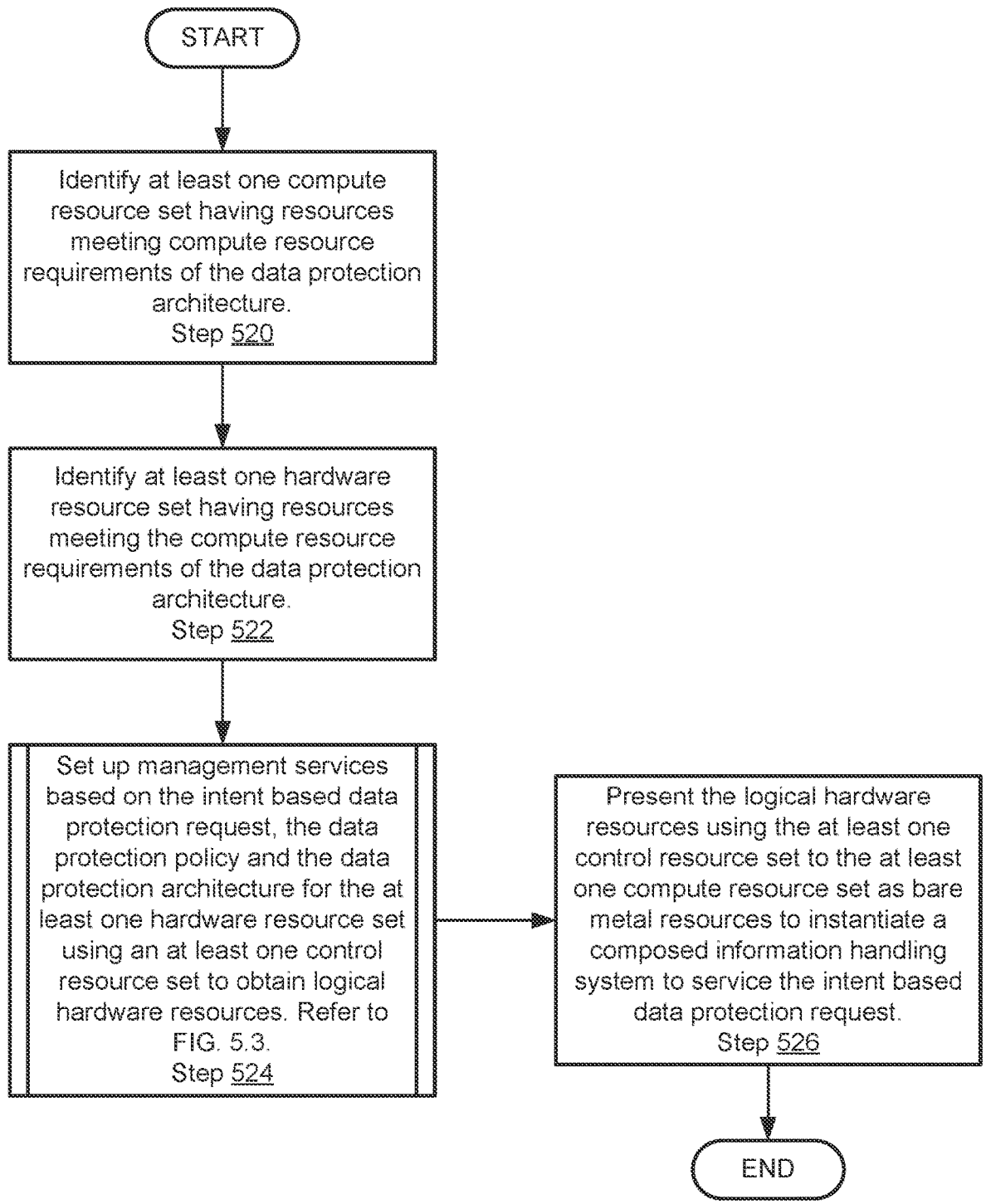
FIG. 5.2

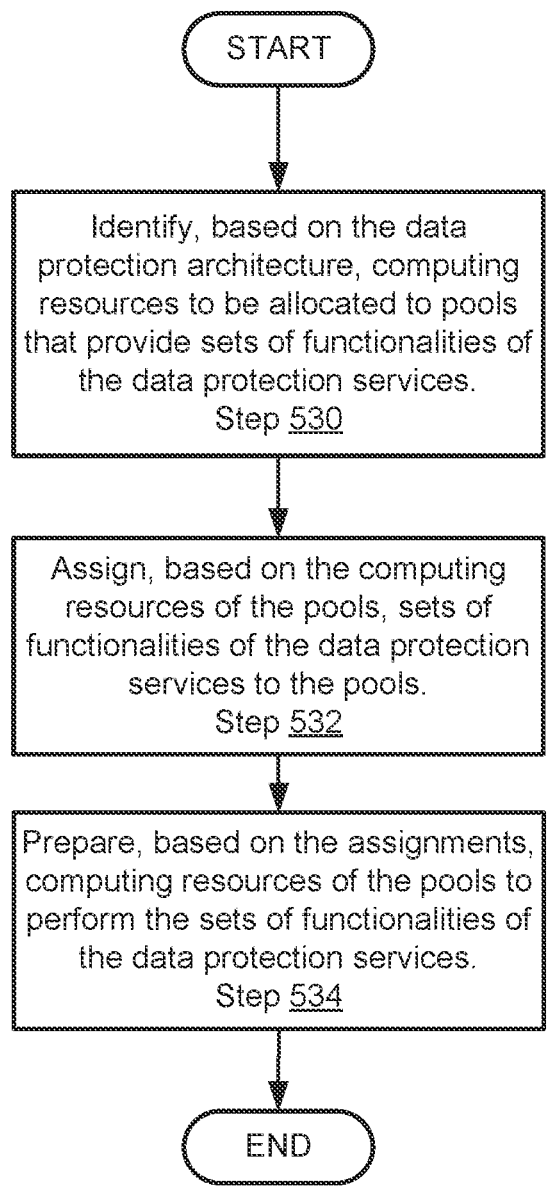
FIG. 5.3

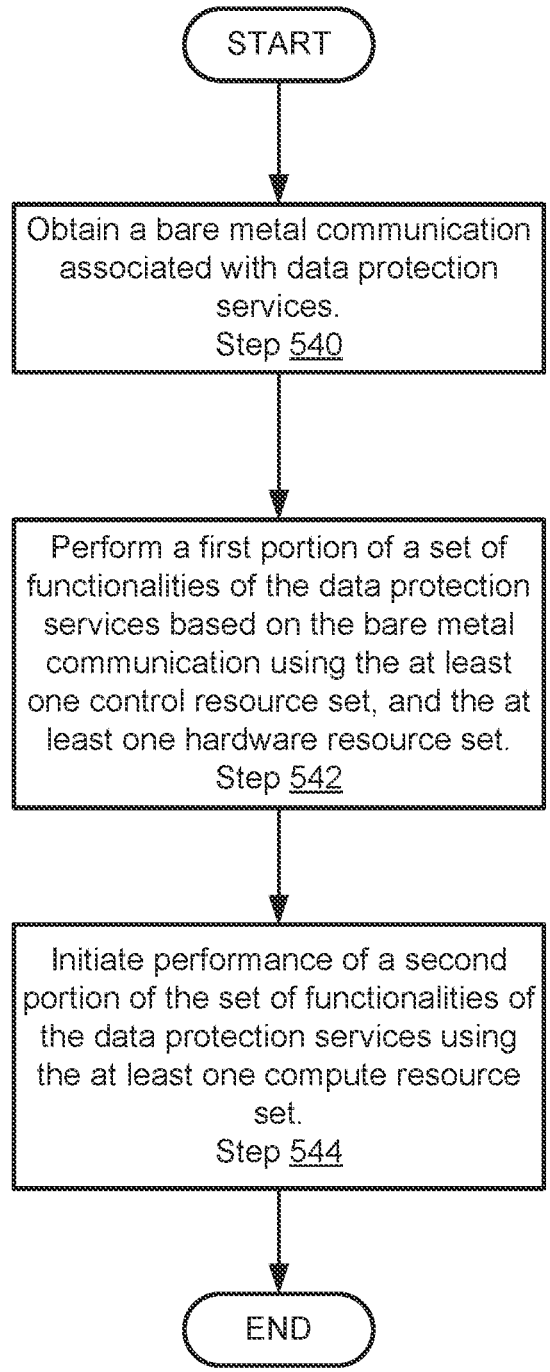
FIG. 5.4

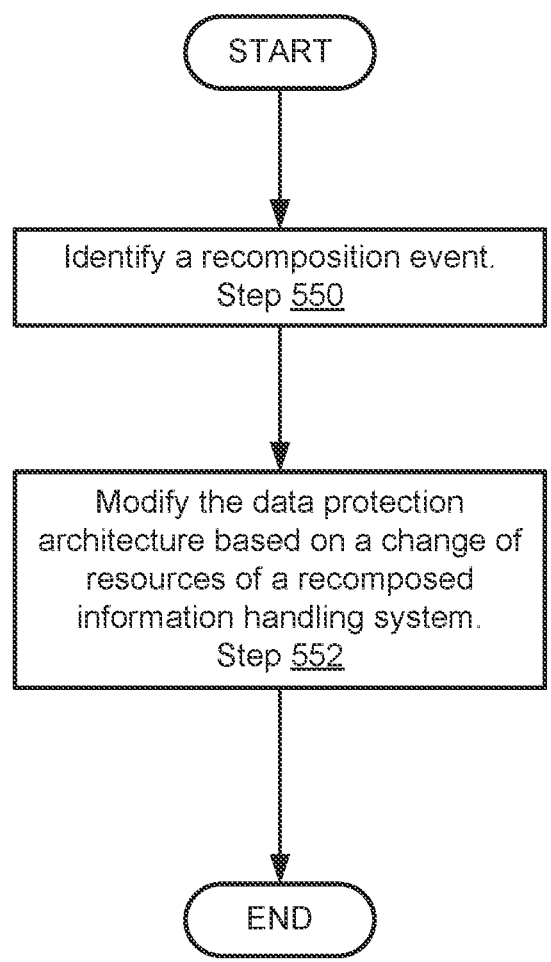
FIG. 5.5

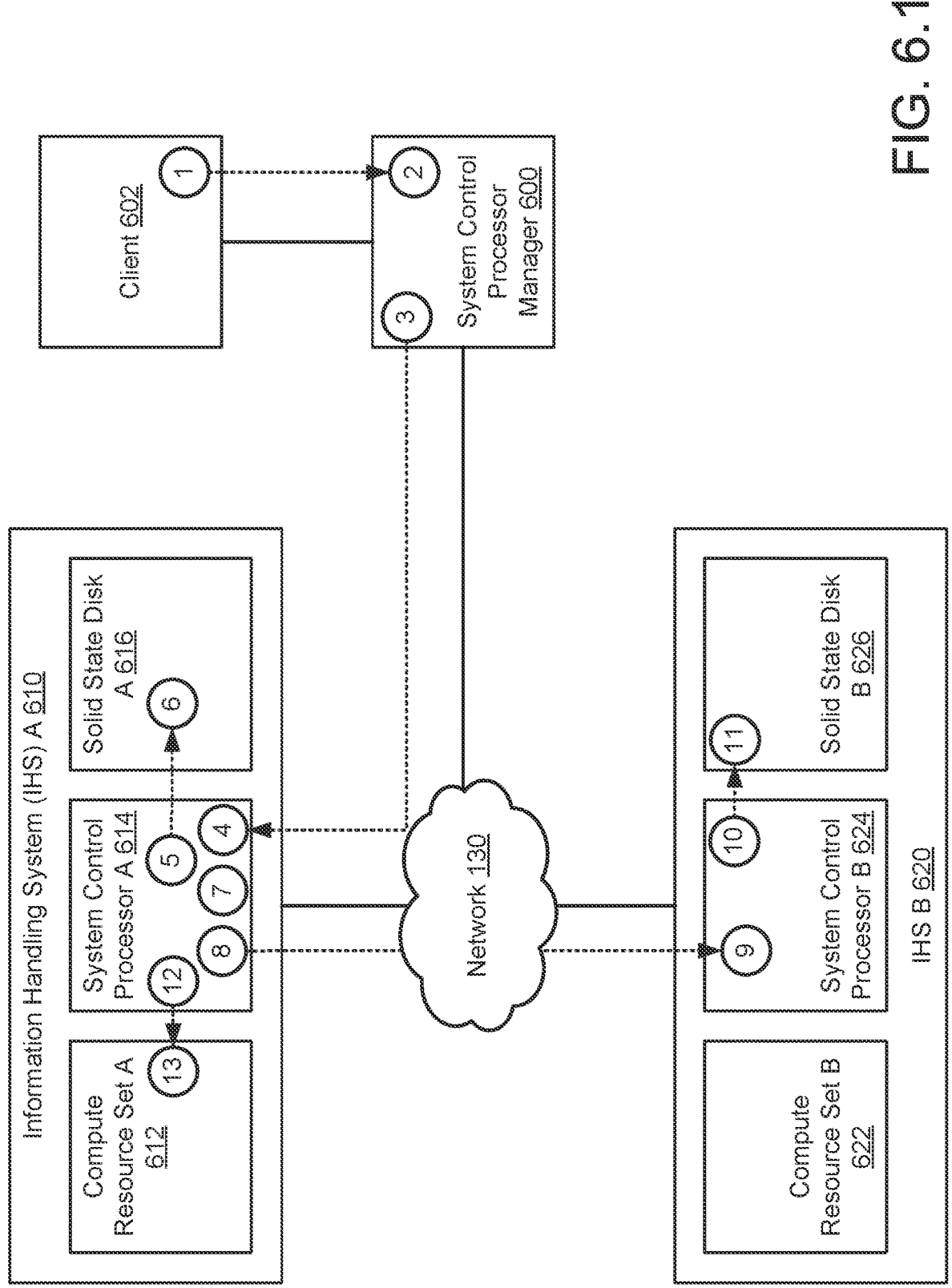
FIG. 6.1

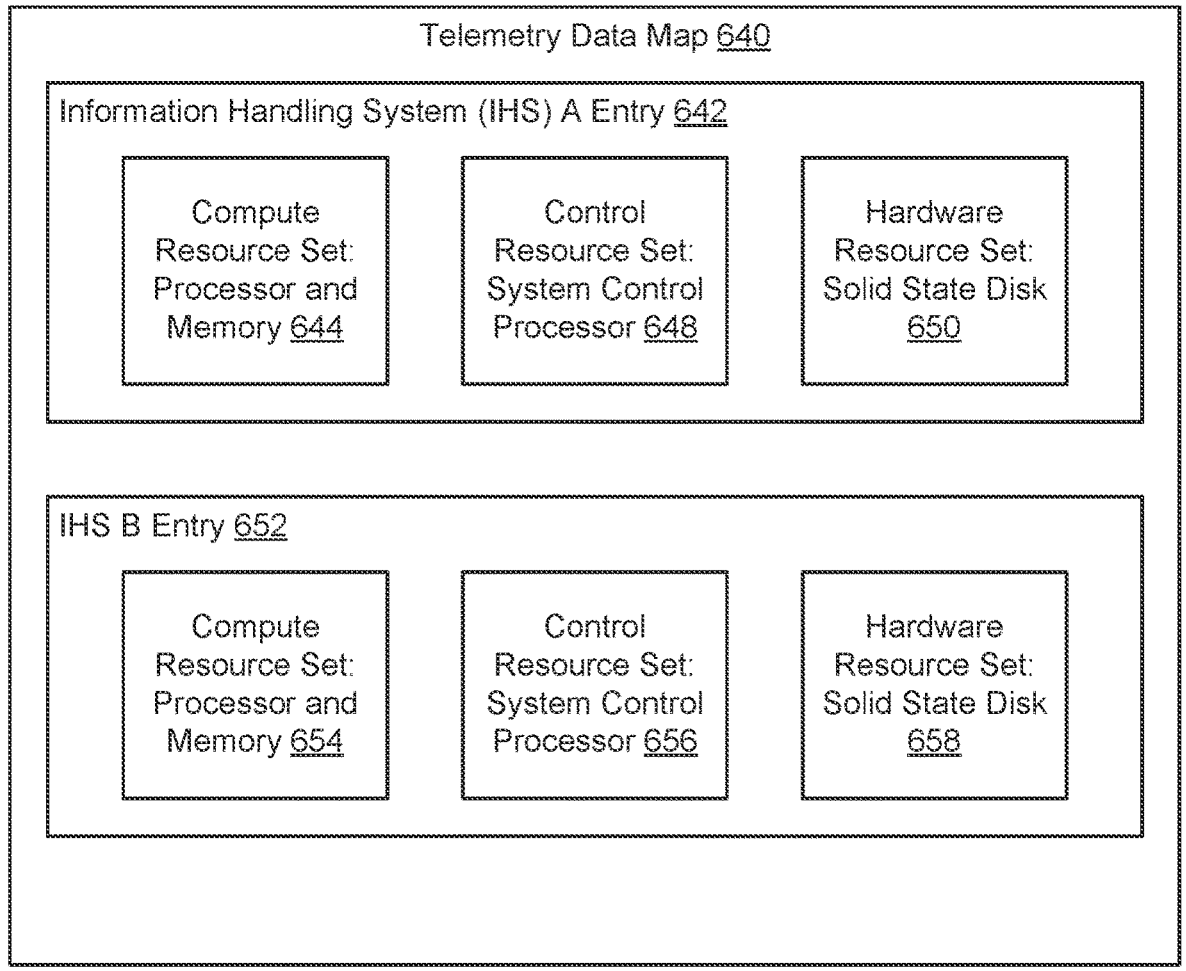
FIG. 6.2

Data Protection Architecture Lookup Table 670

Data Protection Architecture A Entry 672

Compute Resources: One Processor, One Gigabyte Memory, Compression Application 674

Control Resources: Backup Generation and Deduplication Application 676

Hardware Resources: One Terabyte Long Term Storage, Ten Gigabytes of Buffer Storage 678

FIG. 6.3

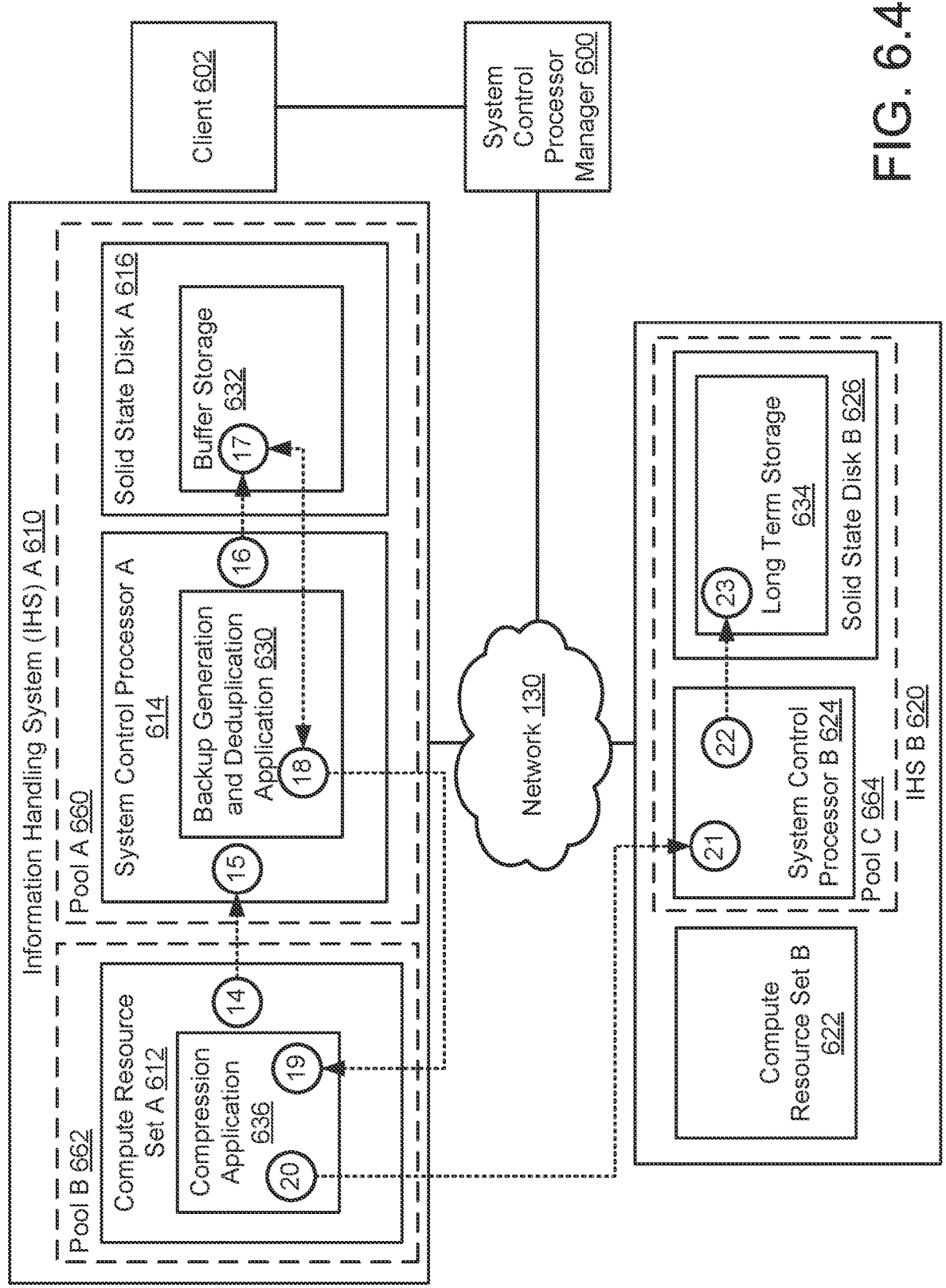
FIG. 6.4

SYSTEM AND METHOD FOR DYNAMIC DATA PROTECTION ARCHITECTURE

BACKGROUND

Computing devices may provide services. To provide the services, the computing devices may include hardware components and software components. The services provided by the computing devices may be limited by these components.

SUMMARY

In one aspect, a system for providing data protection services for data generated by control plane applications hosted by composed information handling systems in accordance with one or more embodiments of the invention includes persistent storage and a system control processor manager. The system control processor manager obtains a data protection architecture to provide data protection services to clients; identifies, based on the data protection architecture, first computing resources to be allocated to a first pool that provides a first set of functionalities of the data protection services; identifies, based on the data protection architecture, second computing resources to be allocated to a second pool that provides a second set of functionalities of the data protection services; assigns, based on hardware components of the first computing resources, a portion of the first set of functionalities to a first portion of the first computing resources; assigns, based on the hardware components of the first computing resources, a second portion of the first set of functionalities to a second portion of the first computing resources; and instantiates, based on the assignments, the data protection architecture.

In one aspect, a method for providing data protection services for data generated by control plane applications hosted by composed information handling systems in accordance with one or more embodiments of the invention includes obtaining a data protection architecture to provide data protection services to clients; identifying, based on the data protection architecture, first computing resources to be allocated to a first pool that provides a first set of functionalities of the data protection services; identifying, based on the data protection architecture, second computing resources to be allocated to a second pool that provides a second set of functionalities of the data protection services; assigning, based on hardware components of the first computing resources, a portion of the first set of functionalities to a first portion of the first computing resources; assigning, based on the hardware components of the first computing resources, a second portion of the first set of functionalities to a second portion of the first computing resources; and instantiating, based on the assignments, the data protection architecture.

In one aspect, a non-transitory computer readable medium in accordance with one or more embodiments of the invention includes computer readable program code, which when executed by a computer processor enables the computer processor to perform a method for providing data protection services for data generated by control plane applications hosted by composed information handling systems. The method includes obtaining a data protection architecture to provide data protection services to clients; identifying, based on the data protection architecture, first computing resources to be allocated to a first pool that provides a first set of functionalities of the data protection services; identifying, based on the data protection architecture, second computing resources to be allocated to a second pool that provides a second set of functionalities of the data protection services; assigning, based on hardware components of the first computing resources, a portion of the first set of functionalities to a first portion of the first computing resources; assigning, based on the hardware components of the first computing resources, a second portion of the first set of functionalities to a second portion of the first computing resources; and instantiating, based on the assignments, the data protection architecture.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an information handling system in accordance with one or more embodiments of the invention.

FIG. 5.1 shows a flowchart of a method of instantiating a composed information handling system based on an intent based data protection request in accordance with one or more embodiments of the invention.

FIG. 5.2 shows a flowchart of a method of instantiating a composed information handling system using a data protection architecture in accordance with one or more embodiments of the invention.

FIG. 5.3 shows a flowchart of a method of setting up management services in accordance with one or more embodiments of the invention.

FIG. 5.4 shows a flowchart of a method of performing data protection services in accordance with one or more embodiments of the invention.

FIG. 5.5 shows a flowchart of a method of modifying a data protection architecture of a recomposed information handling system in accordance with one or more embodiments of the invention.

FIGS. 6.1-6.4 shows diagrams of the operation of an example system over time in accordance with one or more embodiments of the invention.

DETAILED DESCRIPTION

Figure 2:
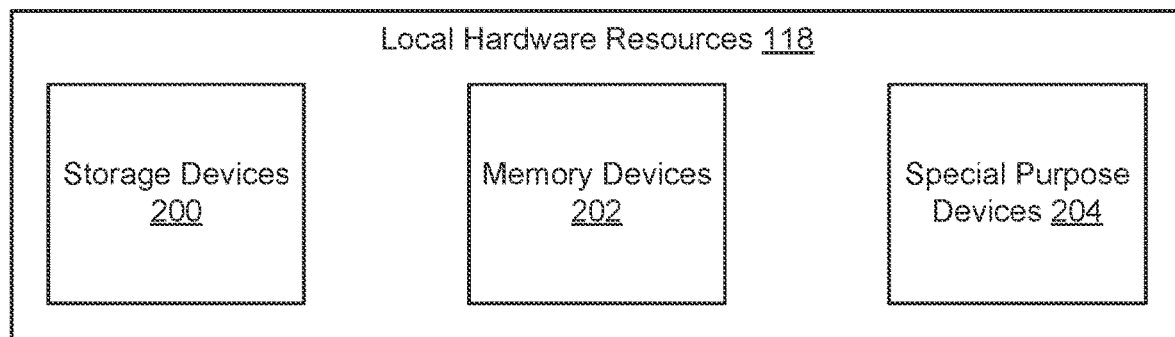
FIG. 2 shows a diagram of local hardware resources in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for providing computer implemented services and data protection services using composed information handling systems. To provide computer implemented services, computing resources may need to be allocated for the performance of the services. The services may include, for example, processing resources, memory, resources, storage resources, computing resources, etc. Computing resources may be generally divided into three classes: compute resources that provide for computation functionality, hardware resources that provide other types of functionality, and control resources that manage the formation of composed systems using compute resources and hardware resources.

To allocate the computing resources, composed information handling systems may be instantiated. A composed information handling system may be a device (the components of which may be distributed across one or more information handling systems) that has exclusive use over a quantity of computing resources. Computing resources from multiple information handling systems may be allocated to a composed information handling system thereby enabling a composed information handling system to utilize computing resources from any number of information handling system for performance of corresponding computer implemented services.

To allocate computing resources, the system may include a system control processor manager. The system control processor manager may obtain intent based data protection requests. The intent based data protection requests may indicate a desired outcome such as, for example, execution of one or more applications, providing of data protection services, etc. The system control processor manager may identify available resources and, based on the available resources and the intent based data protection request, identify a data protection policy and a data protection architecture to satisfy the intent (e.g., goal) of the intent based data protection requests.

Once the data protection policy and architecture are identified, the system control processor manager may allocate resources of any number of information handling system into pools, assign sets of functionalities of data protection services to the pools, and instantiate any number of composed information handling system to instantiate the data protection architecture. When instantiating the composed information handling systems, the system control processor manager may assign sets of functionalities of data protection services to the pools based on the computing resources included in the pools, and prepare the pools of the composed information handling systems to perform the assigned data protection functionalities.

For example, some functions of the data protection architecture may be compute intensive, storage intensive, communications intensive, memory intensive, or any combination thereof. Similarly, some functions of the data protection architecture may be minimally compute intensive, minimally storage intensive, minimally communications intensive, minimally memory intensive, or any combination thereof. The system control processor manager may identify and assign resource sets to form composed information handling systems and assign the composed information handling systems to corresponding pools based on the functionalities that each of the pools will perform. Consequently, the system control processor manager may preferentially perform functionalities of the data protection architecture based on the capabilities of the resources and composed information handling systems formed using the resources.

Once the data protection architecture is instantiated, data may be flowed through the data protection architecture. Flowing data may relate to the process of sequentially processing the data for storage and future retrieval. Data may be flowed by performing any number of processes on the data in a predetermined order. In the data protection architecture, different composed information handling systems (e.g., those in different pools that provide different portions of the data protection services) may perform different portions of the process of flowing the data to prepare it for storage and future retrieval.

By doing so, embodiments of the invention may instantiate specialized data protection architectures that are unified by ensuring that each of the composed information handling systems in the data protection architecture includes pools of computing resources that each efficiently perform specific data protection functionalities in accordance with the identified data protection policy. Accordingly, a system in accordance with embodiments of the invention may provide a unified data protection architecture.

FIG. 1.1 shows a system in accordance with one or more embodiments of the invention. The system may include any number of information handling systems (60). The information handling systems (60) may provide computer implemented services. The computer implemented services may include, for example, database services, data storage services, electronic communications services, data protection services, and/or other types of services that may be implemented using information handling systems.

The information handling system of the system of FIG. 1.1 may operate independently and/or cooperatively to provide the computer implemented services. For example, a single information handling system (e.g., 62) may provide a computer implemented service on its own (i.e., independently) while multiple other information handling systems (e.g., 62, 64) may provide a second computer implemented service cooperatively (e.g., each of the multiple other information handling systems may provide similar and or different services that form the cooperatively provided service).

To provide computer implemented services, the information handling systems (60) may utilize computing resources provided by hardware devices. The computing resources may include, for example, processing resources, storage resources, memory resources, graphics processing resources, communications resources, and/or other types of resources provided by the hardware devices. Various hardware devices may provide these computing resources.

Performing the computer implemented services may result in the generation of data. The data may be important to the system and/or a user or the system and may be required to be stored for protection and/or restoration purposes. The data may be stored for other and/or additional purposes without departing from the invention. Storing the data in the hardware devices of the system may be problematic because hardware devices may fail. The failure of hardware device may result in data loss and/or data corruption.

In general, embodiments of the invention relate to system, methods, and devices for managing the hardware resources of the information handling systems (62) and/or other resources (e.g., external resources (30)) to provide data protection services for data generated by the system. The hardware resources of the information handling systems (62) may be managed by instantiating one or more composed information handling systems using the available hardware resources of the information handling systems (62), external resources (30), and/or other types of hardware devices operably connected to the information handling systems (62). During the instantiation of the composed information handling systems, a data protection policy and a data protection architecture may be identified. The computing resources of the data protection architecture may be divided into pools, assigned sets of functionalities of data protection services, and setup to perform the sets of functionalities of the data protection services for the composed information handling system, including the generation of backups of data, further protecting data stored in the composed information handling systems. Consequently, data protection services may be provided to the composed information handling systems in an efficient and manner using a specialized data protection architecture, resulting in the increased protection of data generated through the performance of computer implemented services by the composed information handling systems.

In one or more embodiments of the invention, the system includes a system control processor manager (50). The system control processor manager (50) may provide composed information handling system composition services. Composed information handling system composition services may include (i) obtaining intent based data protection requests for composed information handling systems and (ii) aggregating computing resources from the information handling systems (60) and/or external resources (30) using system control processors to service the intent based data protection requests by instantiating composed information handling systems in accordance with the requests. Aggregating computing resources, the system control processor manager (50) may take into account both the availability of and need for the computing resources. By doing so, instantiated composed information handling systems may provide computer implemented services in accordance with the intent based data protection requests.

In one or more embodiments of the invention, the system control processor manager (50) instantiates composed information handling systems in accordance with a three resource set model. As will be discussed in greater detail below, the computing resources of an information handling system may be divided into three logical resource sets: a compute resource set, a control resource set, and a hardware resource set. Different resource sets, or portions thereof, from the same or different information handling systems may be aggregated (e.g., caused to operate as a computing device) to instantiate a composed information handling system having at least one resource set from each set of the three resource set model.

By logically dividing the computing resources of an information handling system into these resource sets, different quantities and types of computing resource may be allocated to each composed information handling system thereby enabling the resources allocated to the respective information handling system to match performed workloads. Further, dividing the computing resources in accordance with the three set model may enable different resource sets to be differentiated (e.g., given different personalities) to provide different functionalities. Consequently, composed information handling systems may be composed on the basis of desired functionalities rather than just on the basis of aggregate resources to be included in the composed information handling system.

Additionally, by composing composed information handling systems in this manner, the control resource set of each composed information handling system may be used to consistently deploy management services across any number of composed information handling systems. Consequently, embodiments of the invention may provide a framework for unified security, manageability, resource management/composability, workload management, and distributed system management by use of this three resource set model. For additional details regarding the system control processor manager (50), refer to FIG. 4.

In one or more embodiments of the invention, a composed information handling system is a device that is formed using all, or a portion, of the computing resources of the information handling systems (60), the external resources (30), and/or other types of hardware devices operably connected to the information handling systems (60). The composed information handling system may utilize the computing resources allocated to it to provide computer implemented services. For example, the composed information handling system may host one or more applications that utilize the computing resources assigned to the composed information handling system. The applications may provide the computer implemented services.

To instantiate composed information handling systems, the information handling systems (60) may include at least three resource sets including a control resource set. The control resource set may include a system control processor. The system control processor of each information handling system may coordinate with the system control processor manager (50) to enable composed information handling systems to be instantiated. For example, the system control processor of an information handling system may provide telemetry data regarding the computing resources of an information handling system, may perform actions on behalf of the system control processor manager (50) to aggregate computing resources together, may organize the performance of duplicative workloads to improve the likelihood that workloads are completed, and/or may provide services that unify the operation of composed information handling systems.

In one or more embodiments of the invention, compute resource sets of composed information handling systems are presented with bare metal resources by control resource sets even when the presented resources are actually being managed using one or more layers of abstraction, emulation, virtualization, security model, etc. For example, the system control processors of the control resource sets may provide the abstraction, emulation, virtualization, data protection, and/or other services while presenting the resources as bare metal resources. Consequently, these services may be transparent to applications hosted by the compute resource sets of composed information handling systems thereby enabling uniform deployment of such services without requiring implementation of control plane entities hosted by the compute resource sets of the composed information handling systems. For additional details regarding the information handling systems (60), refer to FIG. 1.2.

The external resources (30) may provide computing resources that may be allocated for use by composed information handling systems. For example, the external resources (30) may include hardware devices that provide any number and type of computing resources. The composed information handling system may use these resource to provide their functionalities. Different external resources (e.g., 32, 34) may provide similar or different computing resources.

In one or more embodiments of the invention, the system of FIG. 1.1 includes backup storages (70) that provide data storage services to the composed information handling systems. The backup storages (70) may include any number of backup storages, for example, the backup storages (70) may include backup storage A (72) and backup storage N (74). The data storage services may include storing of data provided by the composed information handling systems and providing previously stored data to the composed information handling systems. The data stored in backup storages (70) may be used for restoration purposes. The data stored in the backup storages (70) may be used for other purposes without departing from the invention. The data stored in backup storages (70) may include backups generated during the performance of data protection services of the composed information handling systems. The backups may be any type of backup (e.g., snapshot, incremental backup, full backup, etc.) without departing from the invention. The data stored in backup storages (70) may include other and/or additional types of data obtained from other and/or additional components without departing from the invention.

The system of FIG. 1.1 may include any number of information handling systems (e.g., 62, 64), any number of external resources (e.g., 32, 34), any number of backup storages (e.g., 72, 74), and any number of system control processor managers (e.g., 50). Any of the components of FIG. 1.1 may be operably connected to any other component and/or other components not illustrated in FIG. 1.1 via one or more networks (e.g., 130). The networks may be implemented using any combination of wired and/or wireless network topologies.

The system control processor manager (50), information handling systems (60), backup storages (70), and/or external resources (30) may be implemented using computing devices. The computing devices may include, for example, a server, laptop computer, a desktop computer, a node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor manager (50), information handling systems (60), backup storages (70), and/or external resources (30) described in this application and/or all, or a portion, of the methods illustrated in FIGS. 5.1-5.5. The system control processor manager (50), information handling systems (60), backup storages (70), and/or external resources (30) may be implemented using other types of computing devices without departing from the invention. For additional details regarding computing devices, refer to FIG. 7.

While the information handling systems (60) have been illustrated and described as including a limited number of specific components, an information handling system in accordance with embodiments of the invention may include additional, fewer, and/or different components without departing from the invention.

Turning to FIG. 1.2, FIG. 1.2 shows a diagram of an information handling system (100) in accordance with one or more embodiments of the invention. Any of the information handling systems (e.g., 60) of FIG. 1.1 may be similar to the information handling system (100) illustrated in FIG. 1.2.

As discussed above, the information handling system (100) may provide any quantity and type of computer implemented services. To provide the computer implemented services, resources of the information handling system may be used to instantiate one or more composed information handling systems. The composed information handling systems may provide the computer implemented services.

To provide computer implemented services, the information handling system (100) may include any number and type of hardware devices including, for example, one or more processors (106), any quantity and type of processor dedicated memory (104), one or more system control processors (114), and any number of hardware resources (118). These hardware devices may be logically divided into three resource sets including a compute resource set (102), a control resource set (108), and a hardware resource set (110).

The control resource set (108) of the information handling system (100) may facilitate formation of composed information handling systems and manage data protection services. To do so, the control resource set (108) may prepare any quantity of resources from any number of hardware resource sets (e.g., 110) (e.g., of the information handling system (100) and/or other information handling systems) for presentation to processing resources of any number of computing resource sets (e.g., 102) (e.g., of the information handling system (100) and/or other information handling systems). Once prepared, the control resource set (108) may present the prepared resources as bare metal resources to the processors (e.g., 106) of the allocated computing resources. By doing so, a composed information handling system may be instantiated.

To prepare the resources of the hardware resource sets for presentation, the control resource set (108) may employ, for example, virtualization, indirection, abstraction, and/or emulation. These management functionalities may be transparent to applications hosted by the resulting instantiated composed information handling systems. Consequently, while unknown to the control plane entities of the composed information handling system, the composed information handling system may operate in accordance with any number of management models thereby providing for unified control and management of composed information handling systems. These functionalities may be transparent to applications hosted by composed information handling systems thereby relieving them from overhead associated with these functionalities.

For example, consider a scenario where a compute resource set is instructed to instantiate a composed information handling system including a compute resource set and a hardware resource set that will contribute storage resources to the compute resource set. The compute resource set may virtualize the storage resources of the hardware resource set to enable a select quantity of the storage resources to be allocated to the composed information handling system while reserving some of the storage resources for allocation to other composed information handling systems. However, the prepared storage resources may be presented to the compute resource set as bare metal resources. Consequently, the compute resource set may not need to host any control plane entities or otherwise incur overhead for utilizing the virtualized storage resources.

The compute resource set (102) may include one or more processors (106) operably connected to the processor dedicated memory (104). Consequently, the compute resource set (102) may host any number of executing processes thereby enabling any number and type of workloads to be performed. When performing the workloads, the compute resource set (102) may utilize computing resources provided by the hardware resource set (110) of the information handling system (100), hardware resource sets of other information handling systems, and/or external resources.

Additionally, the compute resource set (102) may include one or more agents (not shown). The agents may be, computer instructions, which when executed by the processors (106), cause the processors (106) to provide the functionality of the agents. The agents may perform a portion of the data protection services discussed throughout this application. For example, the agents may generate backups of data generated by applications hosted by the processors (106) of the compute resource set (102) and provide the backups to the system control processors (114). The agents may include other and/or additional functionality without departing from the invention.

The processors (106) of the compute resource set (102) may be operably connected to one or more system control processors (114) of the control resource set (108). For example, the processors (106) may be connected to a compute resource interface (112), which is also connected to the system control processors (114).

The system control processors (114) of the control resource set (108) may present computing resources to the processors (106) as bare metal resources. In other words, from the point of view of the processors (106), any number of bare metal resources may be operably connected to it via the compute resources interface (112) when, in reality, the system control processors (114) are operably connected to the processors (106) via the compute resources interface (112). In other words, the system control processors (114) may manage presentation of other types of resources to the compute resource set (102).

By presenting the computing resources to the processors as bare metal resources, control plane entities (e.g., applications) such as hypervisors, emulators, and/or other types of management entities may not need to be hosted (e.g., executed) by the processors (106) for the processors (106) and entities hosted by them to utilize the computing resources allocated to a composed information handling system. Accordingly, all of the processing resources provided by the compute resource set (102) may be dedicated to providing the computer implemented services.

For example, the processors (106) may utilize mapped memory addresses to communicate with the bare metal resources presented by the system control processors (114) to the processors (106). The system control processors (114) may obtain these communications and appropriately remap (e.g., repackage, redirect, encapsulate, etc.) the communications to the actual hardware devices providing the computing resources, which the processors (106) are interacting with via the compute resources interface (112) and/or hardware resources interface (116), discussed below. Consequently, indirection, remapping, and/or other functions required for resource virtualization, emulation, abstraction, or other methods of resource allocation (other than bare metal) and manage may not need to be implemented via the processors (106).

By doing so, any number of functions for a composed information handling system may be automatically performed in a manner that is transparent to the control plane. Accordingly, a composed information handling system may operate in a manner consistent with a unified, consistent architecture or model (e.g., communications model, data storage model, etc.) by configuring the operation of one or more system control processors in a manner consistent with the architecture or model.

In one or more embodiments of the invention, control plane entities utilize computing resources presented through one or more layers of indirection, abstraction, virtualization, etc. In other words, an indirect user of hardware devices and computing resources provided thereby.

In one or more embodiments of the invention, data plane entities directly utilize computing resources. For example, data plane entities may instruct hardware devices on their operation thereby directly utilizing computing resources provided thereby. Data plane entities may present the computing resources to control plane entities using one or more layers of indirection, abstraction, virtualization, etc.

The system control processors (114) may present any number of resources operably connected to it (e.g., the hardware resource set (110), other resources operably connected to it via an interface (e.g., hardware resources interface (116), etc.) as bare metal resources to the processors (106) of the compute resource set (102). Consequently, the system control processors (114) may implement device discovery processes compatible with the processors (106) to enable the processors (106) to utilize the presented computing resources.

For example, the hardware resource set (110) may include hardware resources (118) operably connected to the system control processors (114) via a hardware resources interface (116). The hardware resources (118) may include any number and type of hardware devices that provide computing resources. For additional details regarding the hardware resources (118), refer to FIG. 2.

In another example, the system control processors (114) may be operably connected to other hardware resource sets of other information handling systems via hardware resources interface (116), network (130), and/or other system control processors of the other information handling systems. The system control processors may cooperatively enable hardware resource sets of other information handling systems to be prepared and presented as bare metal resources to the compute resource set (102).

In an additional example, the system control processors (114) may be operably connected to external resources via hardware resources interface (116) and network (130). The system control processors (114) may prepare and present the external resources as bare metal resources to the compute resource set (102).

Figure 3:
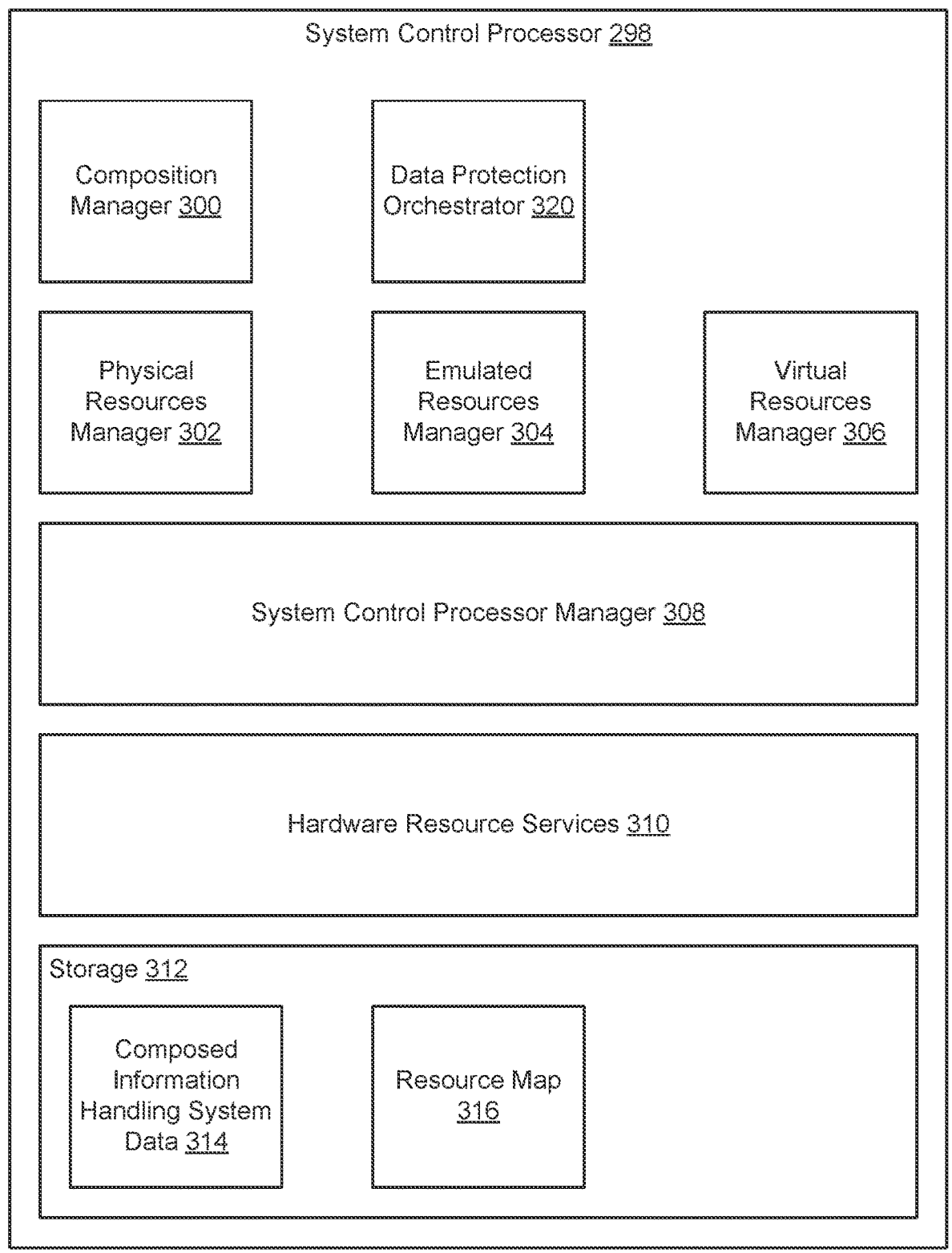
FIG. 3 shows a diagram of a system control processor in accordance with one or more embodiments of the invention.

For additional details regarding the operation and functions of the system control processors (114), refer to FIG. 3.

The compute resources interface (112) may be implemented using any suitable interconnection technology including, for example, system buses such as compute express links or other interconnection protocols. The compute resources interface (112) may support any input/output (IO) protocol, any memory protocol, any coherence interface, etc. The compute resources interface (112) may support processor to device connections, processor to memory connections, and/or other types of connections. The compute resources interface (112) may be implemented using one or more hardware devices including circuitry adapted to provide the functionality of the compute resources interface (112).

The hardware resources interface (116) may be implemented using any suitable interconnection technology including, for example, system buses such as compute express links or other interconnection protocols. The hardware resources interface (116) may support any input/output (TO) protocol, any memory protocol, any coherence interface, etc. The hardware resources interface (116) may support processor to device connections, processor to memory connections, and/or other types of connections. The hardware resources interface (116) may be implemented using one or more hardware devices including circuitry adapted to provide the functionality of the hardware resources interface (116).

In some embodiments of the invention, the compute resource set (102), control resource set (108), and/or hardware resource set (110) may be implemented as separate physical devices. In such a scenario, the compute resources interface (112) and hardware resources interface (116) may include one or more networks enabling these resource sets to communicate with one another. Consequently, any of these resource sets (e.g., 102, 108, 110) may include network interface cards or other devices to enable the hardware devices of the respective resource sets to communicate with each other.

In one or more embodiments of the invention, the system control processors (114) support multiple, independent connections. For example, the system control processors (114) may support a first network communications connection (e.g., an in-band connection) that may be allocated for use by applications hosted by the processors (106). The system control processors (114) may also support a second network communications connection (e.g., an out-of-band connection) that may be allocated for use by applications hosted by the system control processors (114). The out-of-ban connection may be utilized for management and control purposes while the in-band connection may be utilized to provide computer implemented services. These connections may be associated with different network endpoints thereby enabling communications to be selectively directed toward applications hosted by the processors (106) and/or system control processors (114). As will be discussed in greater detail with respect to FIG. 3, the system control processors (114) may utilize the out-of-band connections to communicate with other devices to manage (e.g., instantiate, monitor, modify, etc.) composed information handling systems.

The network (130) may correspond to any type of network and may be operably connected to the Internet or other networks thereby enabling the information handling system (100) to communicate with any number and type of other devices.

In one or more embodiments of the invention, the resources of one or more information handling systems (e.g., 100) may be included in a pool (not shown) by the system control processor manager (50, FIG. 1.1) during the instantiation of a composed information handling system. A composed information handling system may include any number of pools without departing from the invention. A pool may refer to a set of resources that perform one or more specific functionalities. A pool may include any number of resources of any type without departing from the invention. A pool may include resources of the compute resource set (102) (e.g., processors dedicated memory (104) and processors (106)), the control resource set (108) (e.g., 114), and/or the hardware resource set (110) (e.g., hardware resources (118). The system control processor manager (50, FIG. 1.1) may assign sets of functionalities to the pools based on the computing resources included in each pool. The sets of functionalities may include sets of functionalities of data protection services. Each pool may perform a set of functionalities of the data protection services, and collectively may perform the data protection services. Through identifying resources to be included in pools and assigning pools with sets of functionalities of data protection services, composed information handling systems may be instantiated that include a specialized data protection architecture that efficiently performs data protection services.

The information handling system (100) may be implemented using computing devices. The computing devices may be, for example, a server, laptop computer, desktop computer, node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the information handling system (100) described in this application and/or all, or a portion, of the methods illustrated in FIGS. 5.1-5.5. The information handling system (100) may be implemented using other types of computing devices without departing from the invention. For additional details regarding computing devices, refer to FIG. 7.

While the information handling system (100) has been illustrated and described as including a limited number of specific components, an information handling system in accordance with embodiments of the invention may include additional, fewer, and/or different components without departing from the invention.

Turning to FIG. 2, FIG. 2 shows a diagram the hardware resources (118) in accordance with one or more embodiments of the invention. As noted above, system control processors of information handling system may present resources including, for example, some of the hardware resources (118) to form a composed information handling system.

The hardware resources (118) may include any number and types of hardware devices that may provide any quantity and type of computing resources. For example, the hardware resources (118) may include storage devices (200), memory devices (202), and special purpose devices (204).

The storage devices (200) may provide storage resources (e.g., persistent storage) in which applications hosted by a composed information handling system may store data including any type and quantity of information. The system control processors or other entities may perform data protection services. In other words, the storage devices (200) may be used to store data and backups of data. The storage devices (200) may include any type and quantity of devices for storing data. The devices may include, for example, hard disk drives, solid state drives, tape drives, etc. The storage devices (200) may include other types of devices for providing storages resources without departing from the invention. For example, the storage devices (200) may include controllers (e.g., redundant array of disk controllers), load balancers, and/or other types of devices.

The memory devices (202) may provide memory resources (e.g., transitory and/or persistent storage) in which a composed information handling system may store data including any type and quantity of information. The memory devices (202) may include any type and quantity of devices for storing data. The devices may include, for example, transitory memory such as random access memory, persistent memory such as enterprise class memory, etc. The memory devices (202) may include other types of devices for providing memory resources without departing from the invention. For example, the storage devices (200) may include controllers (e.g., replication managers), load balancers, and/or other types of devices.

The special purpose devices (204) may provide other types of computing resources (e.g., graphics processing resources, computation acceleration resources, etc.) to composed information handling systems. The special purpose devices (204) may include any type and quantity of devices for providing other types of computing resources. The special purpose devices (204) may include, for example, graphics processing units for providing graphics processing resources, compute accelerators for accelerating corresponding workloads performed by composed information handling systems, application specific integrated circuits (ASICs) for performing other functionalities, digital signal processors for facilitating high speed communications, etc. The special purpose devices (204) may include other types of devices for providing other types of computing resources without departing from the invention.

The system control processors of the information handling systems may mediate presentation of the computing resources provided by the hardware resources (118) to computing resource sets (e.g., as bare metal resources to processors). When doing so, the system control processors may provide a layer of abstraction that enables the hardware resources (118) to be, for example, virtualized, emulated as being compatible with other systems, and/or directly connected to the compute resource sets (e.g., pass through). Consequently, the computing resources of the hardware resources (118) may be finely, or at a macro level, allocated to different composed information handling systems.

Additionally, the system control processors may manage operation of these hardware devices in accordance with one or more models including data protection models. The models may include other models such as, for example, security models, workload performance availability models, reporting models, etc. The data protection models may include performing data protection services for data generated by the composed information handling system.

In one or more embodiments of the invention, the data protection services include generating backups of data generated by compute resource sets of the composed information handling systems. The system control processors may obtain bare metal communications from computing resources indicating writes of data. In response to obtaining the bare metal communications, the system control processors may generate backups of the data, store the original data in a storage resource in a hardware device of the hardware resource set, and send the backup to a backup storage. The data protection services may include other types of data protection services such as deduplication, erasure coding, compression, replication and other and/or additional data protection services without departing from the invention.

To perform the aforementioned data protection services, during the instantiation of a composed information handling system, the system control processor manager may identify available resources of the system, and based on an intent based data protection request and the available resources, identify a data protection policy and a data protection architecture to use to perform the aforementioned data protection services. The system control processor manager may prepare one or more system control processors and/or other components of the data protection architecture to provide the data protection services specified by the data protection policy. The system control processor manager may instruct the one or more system control processors to perform data protection services using the data protection architecture.

The manner of operation of these devices i.e., the performance of the aforementioned data protection services, may be transparent to at least a portion of the computing resource sets utilizing these hardware devices for providing computer implemented services. Consequently, even though the resulting composed information handling system control plane may be unaware of the implementation of these models, the composed information handling systems may still operate in accordance with these models thereby providing a method of managing the data protection services for composed information handling systems.

While the hardware resources (118) have been illustrated and described as including a limited number of specific components, local hardware resources in accordance with embodiments of the invention may include additional, fewer, and/or different components without departing from the invention.

As discussed above, information handling systems may include system control processors that may be used to instantiate composed information handling systems. FIG. 3 shows a diagram of a system control processor (298) in accordance with one or more embodiments of the invention. Any of the system control processors included in control resources sets of FIG. 1.2 may be similar to the system control processor (298) illustrated in FIG. 3.

The system control processor (298) may facilitate instantiation and operation of composed information handling systems. By doing so, a system that includes information handling systems may dynamically instantiate composed information handling systems to provide computer implemented services and to provide data protection services to the composed information handling system.

To instantiate and operate composed information handling systems, the system control processor (298) may include a composition manager (300), a physical resources manager (302), an emulated resources manager (304), a virtual resources manager (306), a data protection orchestrator (320), an system control processor manager (308), hardware resource services (310), and storage (312). Each of these components of the system control processor is discussed below.

The composition manager (300) may manage the process of instantiating and operating composed information handling systems. To provide these management services, the composition manager (300) may include functionality to (i)

obtain information regarding the hardware components of the information handling system (e.g., obtain telemetry data regarding the information handling system), (ii) provide the obtained information to other entities (e.g., management entities such as system control processor manager (50, FIG. 1.1)), (iii) obtain intent based data protection requests for composed information handling systems, (iv) based on the intent based data protection requests, prepare and present resources as bare metal resources to compute resource sets, (v) instantiate applications in composed information handling systems to cause the composed information handling systems to provide computer implemented services, conform their operation to data protection models, etc., (vi) manage the operation of the composed information handling systems by, for example, providing data protection services, (vii) add/remove/modify resources presented to the compute resource sets of composed information handling systems dynamically in accordance with workloads being performed by the composed information handling systems, and/or (viii) coordinate with other system control processors to provide distributed system functionalities. By providing the above functionalities, a system control processor in accordance with one or more embodiments of the invention may enable distributed resources from any number of information handling systems to be aggregated into a composed information handling system to provide computer implemented services.

To obtain information regarding the hardware components of the information handling system, the composition manager (300) may inventory the components of the information handling system hosting the system control processor. The inventory may include, for example, the type and model of each hardware component, versions of firmware or other code executing on the hardware components, and/or information regarding hardware components of the information handling system that may be allocated to form composed information handling systems.

The composition manager (300) may obtain intent based data protection requests from other entities (e.g., management entities tasked with instantiating composed information handling systems), as pre-loaded instructions present in storage of the system control processor, and/or via other methods. The intent based data protection requests may specify, for example, the types of computing resources to be allocated to a composed information handling system.

In one or more embodiments of the invention, the intent based data protection requests specify the computing resource allocations using an intent based model. For example, rather than specifying specific hardware devices (or portions thereof) to be allocated to a particular compute resource set to obtain a composed information handling system, the resource requests may only specify that a composed information handling system is to be instantiated having predetermined characteristics, that a composed information handling system will perform certain workloads or execute certain applications, and/or that the composed information handling system be able to perform one or more predetermined functionalities. In such a scenario, the composition manager (300) may decide how to instantiate the composed information handling system (e.g., which resources to allocate, how to allocate the resources (e.g., virtualization, emulation, redundant workload performance, data integrity models to employ, etc.), to which compute resource set(s) to present corresponding computing resources, etc.).

In addition to specifying resource allocations, the intent based data protection requests may also specify, for example, applications to be hosted by the composed information handling systems and data protection models to be employed by the composed information handling system. The intent based data protection requests may also specify security models to be employed by the composed information handling systems, communication models to be employed by the composed information handling systems, user/entity access credentials for use of the composed information handling systems, and/or other information usable to place the composed information handling systems into states in which the composed information handling systems provide desired computer implemented services.

To prepare and present resources to compute resource sets based on the intent based data protection requests, the system control processors may implement, for example, abstraction, indirection, virtualization, mapping, emulation, and/or other types of services that may be used to present any type of resources as a resource that is capable of bare metal utilization by compute resource sets. To provide these services, the composition manager (300) may invoke the functionality of the physical resources manager (302), the emulated resources manager (304), and/or the virtual resources manager (306).

Additionally, the system control processors may take into account an importance of completion of workloads when preparing and presenting resources. For example, some workloads that may be performed by various hardware devices may be critical (e.g., high availability workloads) to the computer implemented services to be provided by a composed information handling system. In such a scenario, the system control processor may over allocate resources (e.g., beyond that requested by a compute resource set) for performance of the workloads so that at least two instances of the workloads can be performed using duplicative resources. By doing so, it may be more likely that at least one of the workloads will be completed successfully. Consequently, the system control processor may provide the output of one of the workloads to compute resource sets of a composed information handling system.

When presenting the resources to the compute resource sets, the system control processor (298) may present the resources using an emulated data plane. For example, the system control processors (298) may receive bare metal communications (e.g., IO from the processors) and respond in a manner consistent with responses of corresponding bare metal devices (e.g., memory). When doing so, the system control processor (298) may translate the communications into actions. The actions may be provided to the hardware devices used by the system control processor (298) to present the bare metal resources to the compute resource set(s). In turn, the hardware devices may perform the actions which results in a composed information handling system providing desired computer implemented services.

In some scenarios, multiple system control processors may cooperate to present bare metal resources to a compute resource set. For example, a single information handling system may not include sufficient hardware devices to present a quantity and/or type of resources to a compute resource set as specified by a intent based data protection request (e.g., present two storage devices to a compute resource set when a single information handling system only includes a single storage device). In this scenario, a second system control processor of a second information handling system operably connected to the system control processor tasked with presenting the resources to a compute resource set may prepare one of its storage devices for presentation. Once prepared, the second system control processor may communicate with the system control processor to enable the system control processor to present the prepared storage device (i.e., the storage device in the information handling system) to the compute resource set. By doing so, resources from multiple information handling system may be aggregated to present a desired quantity of resources to compute resource set(s) to form a composed information handling system.

By forming composed information handling systems as discussed above, embodiments of the invention may provide a system that is able to effectively utilize distributed resources across a range of devices to provide computer implemented services.

The physical resources manager (302) may manage presentation of resources to compute resource sets. For example, the physical resources manager (302) may generate, for example, translation tables that specify actions to be performed in response to bare metal communications obtained from compute resource sets. The translation tables may be used to take action in response to communications from compute resource sets.

The physical resources manager (302) may generate the translation tables based on the components of the compute resource sets, allocations or other types of commands/communications obtained from the compute resource sets, and the resources of the information handling system allocated to service the compute resource set. For example, when a compute resource set is presented with a bare metal resource, it may go through a discovery process to prepare the bare metal resource for use. As the discovery process proceeds, the compute resource set may send commands/communications to the bare metal resource to, for example, discover its address range. The physical resources manager (302) may monitor this process, respond appropriately, and generate the translation table based on these command and the resources available to service these bare metal commands/communications.

For example, consider a scenario where a virtualized disk is allocated to service bare metal storage commands from a compute resource set. In such a scenario, the physical resources manager (302) may generate a translation table that translates physical write from the compute resource set to virtualized writes corresponding to the virtualized disk. Consequently, the virtualized disk may be used by the system control processor (298) to present bare metal resources to the compute resource set.

The emulated resources manager (304) may generate emulation tables that enable resources that would otherwise be incompatible with a compute resource set to be compatible with the compute resource set. Different types of hardware devices of a compute resource set may be compatible with different types of hardware devices. Consequently, resources allocated to provide bare metal resources may not necessarily be compatible with the hardware devices of a compute resource set. The emulated resources manager (304) may generate emulation tables that map bare metal communications obtained from a compute resource set to actions that are compatible with resources allocated to provide bare metal resources to the compute resource sets.

The virtual resources manager (306) may manage virtualized resources that may be allocated to provide bare metal resources to compute resource sets. For example, the virtual resources manager (306) may include hypervisor functionality to virtualized hardware resources and allocate portions of the virtualized resources for use in providing bare metal resources.

While the physical resources manager (302), emulated resources manager (304), and virtual resources manager (306) have been described as generating tables, these components of the system control processor may generate other types of data structures or utilize different management models to provide their respective functionalities without departing from the invention.

To provide the aforementioned data protection services, the system control processor (298) may include the data protection orchestrator (320). The data protection orchestrator may include the functionality to perform the data protection services. The data protection services may include generating backups of data based on a data protection policy using the data protection architecture of the composed information handling systems, and providing backups to the backup storages (e.g., 70, FIG. 1.1). The data protections services may include other and/or additional types of data protection services (e.g., deduplication, erasure coding, compression, replication, etc.) without departing from the invention. For additional information regarding the data protection services, refer to FIG. 5.3. Other components of the system control processor (298) (e.g., composition manager (300)) may perform all, or a portion, of the data protection services without departing from the invention.

The functionalities of the physical resources manager (302), emulated resources manager (304), virtual resources manager (306), and the data protection orchestrator (320) may be utilized in isolation and/or combination to provide bare metal resources to compute resource sets and to provide management services to the composed information handling system. By doing so, the system control processor (298) may address compatibility issues, sizing issues to match available resources to those that are to be allocated, and/or other issues to enable bare metal resources to be presented to compute resource sets.

When providing bare metal resources, the composition manager (300) may invoke the functionality of the physical resources manager (302), emulated resources manager (304), and virtual resources manager (306). Consequently, resources may be presented as bare metal resources via pass-through (i.e., forwarding IO from compute resource sets to hardware devices), bare metal resource addressing of virtualized resources, and/or as emulated resources compatible with the hardware components of the compute resource set.

The functionality of the physical resources manager (302), emulated resources manager (304), virtual resources manager (306), and the data protection orchestrator (320) may be invoked using any communication model including, for example, message passing, state sharing, memory sharing, etc.

The system control processor manager (308) may manage the general operation of the system control processor (298). For example, the system control processor manager (308) may operate as an operating system or other entity that manages the resources of the system control processor (298). The composition manager (300), physical resources manager (302), emulated resources manager (304), virtual resources manager (306), and the data protection orchestrator (320) and/or other entities hosted by the system control processor (298) may call or otherwise utilize the system control processor manager (308) to obtain appropriate resources (e.g., processing resources, memory resources, storage, communications, etc.) to provide their functionalities.

The hardware resource services (310) may facilitate use of the hardware components of any number of hardware resource sets (e.g., 110, FIG. 1.1). For example, the hardware resource services (310) may include driver functionality to appropriately communicate with the hardware devices of hardware resource sets. The hardware resource services (310) may be invoked by, for example, the system control processor manager (308).

When providing their functionalities, any of the aforementioned components of the system control processor (298) may perform all, or a portion, methods illustrated in FIGS. 5.1-5.5.

The system control processor (298) may be implemented using computing devices. The computing devices may be, for example, an embedded computing device such a system on a chip, a processing device operably coupled to memory and storage, or another type of computing device. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor (298) described in this application and/or all, or a portion, of the methods illustrated in FIGS. 5.1-5.3. The system control processor (298) may be implemented using other types of computing devices without departing from the invention. For additional details regarding computing devices, refer to FIG. 6.

In one or more embodiments of the invention, the system control processor (298) is implemented as an on-board device. For example, the system control processor (298) may be implemented using a chip including circuitry disposed on a circuit card. The circuit card may also host the compute resource sets and/or hardware resource sets managed by the system control processor (298).

In one or more embodiments of the invention, the composition manager (300), physical resources manager (302), emulated resources manager (304), virtual resources manager (306), data protection orchestrator (320), system control processor manager (308), and/or hardware resource services (310) are implemented using a hardware device including circuitry. The hardware device may be, for example, a digital signal processor, a field programmable gate array, or an application specific integrated circuit. The circuitry may be adapted to cause the hardware device to perform the functionality of the composition manager (300), physical resources manager (302), emulated resources manager (304), virtual resources manager (306), data protection orchestrator (320), system control processor manager (308), and/or hardware resource services (310). The composition manager (300), physical resources manager (302), emulated resources manager (304), virtual resources manager (306), data protection orchestrator (320), system control processor manager (308), and/or hardware resource services (310) may be implemented using other types of hardware devices without departing from the invention.

In one or more embodiments of the invention, the composition manager (300), physical resources manager (302), emulated resources manager (304), virtual resources manager (306), data protection orchestrator (320), system control processor manager (308), and/or hardware resource services (310) are implemented using a processor adapted to execute computing code stored on a persistent storage (e.g., as part of the system control processor (298) or operably connected to the system control processor (298) thereby enabling processors of the system control processor (298) to obtain and execute the computing code) that when executed by the processor performs the functionality of the composition manager (300), physical resources manager (302), emulated resources manager (304), virtual resources manager (306), data protection orchestrator (320), system control processor manager (308), and/or hardware resource services (310). The processor may be a hardware processor including circuitry such as, for example, a central processing unit or a microcontroller. The processor may be other types of hardware devices for processing digital information without departing from the invention.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

In one or more embodiments disclosed herein, the storage (312) is implemented using physical devices that provide data storage services (e.g., storing data and providing copies of previously stored data). The devices that provide data storage services may include hardware devices and/or logical devices. For example, storage (312) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (312) may include a memory device (e.g., a dual in line memory device) in which data is stored and from which copies of previously stored data are provided. In another example, storage (312) may include a persistent storage device (e.g., a solid-state disk drive) in which data is stored and from which copies of previously stored data is provided. In a still further example, storage (312) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (312) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (312) may store data structures including, for example, composed information handling system data (314) and a resource map (316). Each of these data structures is discussed below.

The composed information handling system data (314) may be implemented using one or more data structures that includes information regarding composed information handling systems. For example, the composed information handling system data (314) may specify identifiers of composed information handling systems and resources that have been allocated to the composed information handling systems.

The composed information handling system data (314) may also include information regarding the operation of the composed information handling systems. The information may include, for example, workload performance data, resource utilization rates over time, and/or other information that may be utilized to manage the operation of the composed information handling systems.

The composed information handling system data (314) may further include information regarding management models employed by system control processors. For example, the composed information handling system data (314) may include information regarding duplicative data stored for data integrity purposes, redundantly performed workloads to meet high availability service requirements, encryption schemes utilized to prevent unauthorized access of data, etc.

The composed information handling system data (314) may be maintained by, for example, the composition manager (300). For example, the composition manager may add, remove, and/or modify information included in the composed information handling system data (314) to cause the information included in the composed information handling system data (314) to reflect the state of the composed information handling systems.

The data structures of the composed information handling system data (314) may be implemented using, for example, lists, tables, unstructured data, databases, etc. While illustrated in FIG. 3 as being stored locally, the composed information handling system data (314) may be stored remotely and may be distributed across any number of devices without departing from the invention.

The resource map (316) may be implemented using one or more data structures that include information regarding resources of the information handling system and/or other information handling systems. For example, the resource map (316) may specify the type and/or quantity of resources (e.g., hardware devices, virtualized devices, etc.) available for allocation and/or that are already allocated to composed information handling systems. The resource map (316) may be used to provide data to management entities such as system control processor managers.

The data structures of the resource map (316) may be implemented using, for example, lists, tables, unstructured data, databases, etc. While illustrated in FIG. 3 as being stored locally, the resource map (316) may be stored remotely and may be distributed across any number of devices without departing from the invention.

The resource map (316) may be maintained by, for example, the composition manager (300). For example, the composition manager (300) may add, remove, and/or modify information included in the resource map (316) to cause the information included in the resource map (316) to reflect the state of the information handling system and/or other information handling systems.

While illustrated in FIG. 3 as being stored locally on the storage (312) of the system control processor (298), the composed information handling system data (314) may be stored remotely and may be distributed across any number of devices including storage devices of the hardware resource set of the composed system without departing from the invention.

While the storage (312) has been illustrated and described as including a limited number and type of data, a storage in accordance with embodiments of the invention may store additional, less, and/or different data without departing from the invention.

While the system control processor (298) has been illustrated and described as including a limited number of specific components, a system control processor in accordance with embodiments of the invention may include additional, fewer, and/or different components without departing from the invention.

Figure 4:
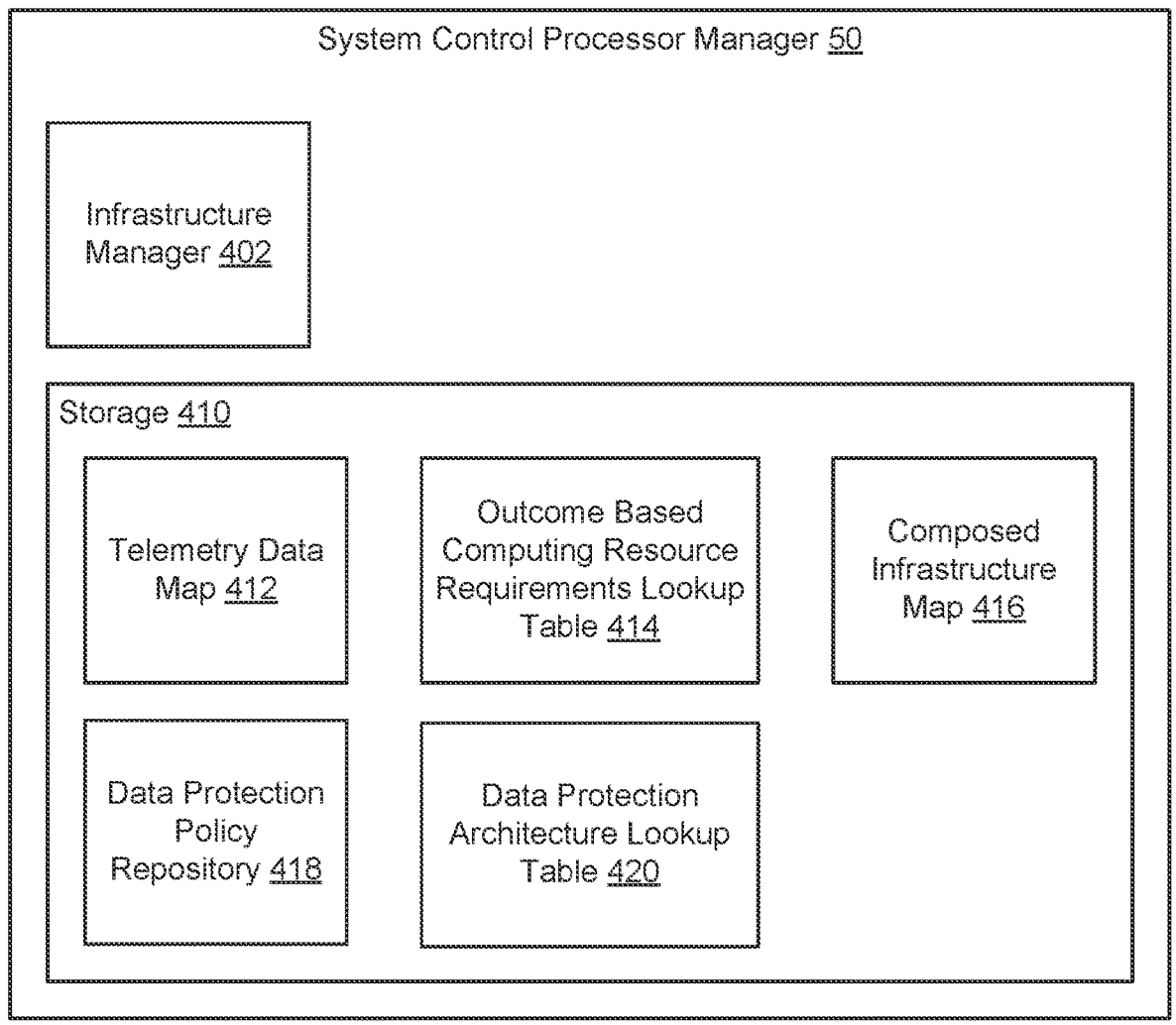
FIG. 4 shows a diagram of a system control processor manager in accordance with one or more embodiments of the invention.

As discussed above, a system control processor manager may cooperate with system control processors of control resource sets to instantiate composed information handling systems by presenting computing resources from hardware resource sets to processors of compute resource sets. FIG. 4 shows a diagram of the system control processor manager (50) in accordance with one or more embodiments of the invention.

The system control processor manager (50) may manage the process of instantiating composed information handling systems. To do so, the system control processor manager (50) may include an infrastructure manager (402) and storage (410). Each of these components is discussed below.

The infrastructure manager (402) may provide composition services. Composition services may include obtaining intent based data protection requests for composed information handling systems, determining the resources to allocate to instantiate composed information handling systems, identifying pools of the resources, assigning sets of functionalities of data protection services to the pools, and cooperating with system control processors to allocate the identified resources. By doing so, the infrastructure manager (402) may cause any number of computer implemented services to be provided using the composed information handling systems.

To determine the resources to allocate to composed information handling systems, the infrastructure manager (402) may employ an intent based model that translates an intent expressed in an intent based data protection request to one more allocations of computing resources. For example, the infrastructure manager (402) may utilize an outcome based computing resource requirements lookup table (414) and a data protection architecture lookup table (420) to match an expressed intent to resources to be allocated to satisfy that intent. The outcome based computing resource requirements lookup table (414) and the data protection architecture lookup table (420) may specify the type, quantity, method of management, and/or other information regarding any number of computing resources that when aggregated will be able to satisfy a corresponding intent.

Additionally, to determine the data protection services to provide to composed information handling systems, the infrastructure manager (402) may use a data protection policy repository (418) to identify data protection policies to use to instantiate composed information handling systems based on the intent based data protection requests. The data protection policy repository (418) may be one or more data structures that may include data protection policies that may specify data protection services, and computing requirements associated with the data protection services, to be provided to the composed information handling system. The infrastructure manager (402) may identify resources for allocation to satisfy intent based data protection requests via other methods without departing from the invention.

To cooperate with the system control processors, the infrastructure manager (402) may obtain telemetry data regarding the computing resources of any number of information handling systems and/or external resources that are available for allocation. The infrastructure manager (402) may aggregate this data in a telemetry data map (412) which may be subsequently used to identify resources of any number of information handling systems and/or external resources to satisfy intent based data protection requests (e.g., instantiate one or more composed information handling systems to meet the requirements of the intent based data protection requests).

When the infrastructure manager (402) identifies the computing resources to be allocated, the infrastructure manager (402) may communicate with any number of system control processors to implement the identified allocations. For example, the infrastructure manager (402) may notify a system control processor of a control resource set that portions of a hardware resource set are to be allocated to a compute resource set to instantiate a composed information handling system. The system control processor may then take action (e.g., prepare the portion of the hardware resource set for presentation to a processor of the compute resource set) in response to the notification.

As composed information handling systems are instantiated, the infrastructure manager (402) may add information reflecting the resources allocated to composed information handling systems, the workloads being performed by the composed information handling systems, and/or other types of information to a composed infrastructure map (416). The infrastructure manager (402) may utilize this information to, for example, decide whether computing resources should be added to or removed from composed information handling system and determine available resources when instantiating composed information handling systems. Consequently, computing resources may be dynamically re-provisioned (or recomposed) over time to meet changing workloads imposed on composed information handling systems.

In one or more embodiments of the invention, the infrastructure manager (402) is implemented using a hardware device including circuitry. The hardware device may be, for example, a digital signal processor, a field programmable gate array, or an application specific integrated circuit. The circuitry may be adapted to cause the hardware device to perform the functionality of the infrastructure manager (402). The infrastructure manager (402) may be implemented using other types of hardware devices without departing from the invention.

In one or more embodiments of the invention, the infrastructure manager (402) is implemented using a processor adapted to execute computing code stored on a persistent storage that when executed by the processor performs the functionality of the infrastructure manager (402). The processor may be a hardware processor including circuitry such as, for example, a central processing unit or a microcontroller. The processor may be other types of hardware devices for processing digital information without departing from the invention.

When providing its functionality, the infrastructure manager (402) may perform all, or a portion, of the methods illustrated in FIGS. 5.1-5.5.

In one or more embodiments disclosed herein, the storage (410) is implemented using physical devices that provide data storage services (e.g., storing data and providing copies of previously stored data). The devices that provide data storage services may include hardware devices and/or logical devices. For example, storage (410) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (410) may include a memory device (e.g., a dual in line memory device) in which data is stored and from which copies of previously stored data are provided. In another example, storage (410) may include a persistent storage device (e.g., a solid-state disk drive) in which data is stored and from which copies of previously stored data is provided. In a still further example, storage (410) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (410) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (410) may store data structures including, for example, the telemetry data map (412), outcome based computing resource requirements lookup table (414), composed infrastructure map (416), data protection policy repository (418), and the data protection architecture lookup table (420). These data structures may be maintained by, for example, the infrastructure manager (402). For example, the infrastructure manager (402) may add, remove, and/or modify information included in these data structures to cause the information included in these data structure to reflect the state of any number of information handling systems, external resources, and/or composed information handling systems.

Any of these data structures may be implemented using, for example, lists, tables, unstructured data, databases, etc. While illustrated in FIG. 4 as being stored locally, any of these data structures may be stored remotely and may be distributed across any number of devices without departing from the invention.

While the storage (410) has been illustrated and described as including a limited number and type of data, a storage in accordance with embodiments of the invention may store additional, less, and/or different data without departing from the invention.

While the system control processor manager (50) has been illustrated and described as including a limited number of specific components, a system control processor manager in accordance with embodiments of the invention may include additional, fewer, and/or different components than those illustrated in FIG. 4 without departing from the invention.

As discussed above, the system of FIG. 1.1 may provide computer implemented services using composed information handling systems. FIGS. 5.1-5.5 show methods that may be performed by components of the system of FIG. 1.1 to manage composed information handling systems.

FIG. 5.1 shows a flowchart of a method in accordance with one or more embodiments of the invention. The method depicted in FIG. 5.1 may be performed to provide computer implemented services using a composed information handling system in accordance with one or more embodiments of the invention. The method shown in FIG. 5.1 may be performed by, for example, a system control processor manager (e.g., 50, FIG. 1.1). Other components of the system in FIG. 1.1 may perform all, or a portion, of the method of FIG. 5.1 without departing from the invention.

While FIG. 5.1 is illustrated as a series of steps, any of the steps may be omitted, performed in a different order, additional steps may be included, and/or any or all of the steps may be performed in a parallel and/or partially overlapping manner without departing from the invention.

In step 500, an intent based data protection request is obtained. The intent based data protection request may be obtained using any method without departing from the invention. For example, the intent based data protection request may be obtained as part of a message from another entity operably connected to a system control processor manager. In another example, the intent based data protection request may be locally stored in a storage of a system control processor manager.

The intent based data protection request may be a data structure one or more data protection goals. A data protection goal specify any type of aspiration with respect to the security, integrity, and/or longevity of stored data. For example, a data protection goal may be to ensure that data is not lost during a particular period of time after it is stored. Such a goal may be accomplished in any number of ways such as, for example, storing multiple copies of the data across multiple fault domains.

As discussed with respect to FIG. 3, the intent based data protection request may specify a desired outcome without specifying the resources to be allocated. The intent based data protection request may include any type and quantity of information usable to specify data protection goals.

In step 502, allocable computing resources of information handling systems are identified. The allocable computing resources may be identified using a telemetry data map (412, FIG. 4) and a composed infrastructure map (416, FIG. 4). The allocable computing resources may be identified via other and/or additional methods without departing from the invention. The allocable computing resources may be those computing resources of any number of information handling systems that are not allocated to composed information handling systems and/or reserved.

For example, the telemetry data map (412, FIG. 4) may specify computing resources of the information handling systems. The telemetry data map (412, FIG. 4) may include a list of compute resource sets, a list of hardware resource sets, identifiers of control resource sets that manage the listed compute resource sets and hardware identifier sets, the hardware devices of the listed compute resource sets and the hardware resource sets, and characteristics and information regarding the compute resource sets and hardware resource sets (e.g., memory size, storage size). The composed infrastructure map may specify composed information handling systems, and the resources (compute resource sets, hardware resource sets, control resource sets, and hardware devices) allocated to the composed information handling systems. By comparing the resources specified in the telemetry data map and the composed infrastructure map and identifying the resources specified in the telemetry data but not in the composed infrastructure map (i.e., resources that are unused and available), the system control processor manager may identify the resources specified in the telemetry data map but not in the composed infrastructure map as the allocable computing resources.

The allocable computing resources may include any number of compute resource sets, control resource sets, hardware resources sets, and hardware devices from any number of information handling systems and/or external resources without departing from the invention. The allocable computing resources may also include a portion of compute resource sets, control resource sets, hardware resource set, and hardware devices (e.g., a portion of stored in a solid state disk drive) without departing from the invention.

In step 504, a data protection policy is obtained based on the allocable computing resources and the intent based data protection request. As noted above, there may be any number of ways in which a data protection goal may be met. However, different implementations may require different types and quantities of computing resources for implementation (e.g., those needed to be allocated to composed information handling systems to meet the data protection goals). Consequently, depending on the type and quantity of allocable computing resources, only a subset of the potential data protection policies may be available for implementation.

In scenarios in which there are not sufficient allocable computing resources to implement a data protection policy of the data protection policy list associated with the intent based data protection request, a data protection policy that best fits the intent based data protection request may be obtained via the methods discussed below. The data protection policy may be implemented using the best possible configuration of allocable resources, even though data protection requirements specified by the data protection policy may not be fully met by the configured allocable resources. In such scenarios, the resulting composed information handling system may be recomposed at a later point in time when other and or additional computing resources become available as allocable resources and the data protection policy requirements may be fully met by the recomposed information handling system.

To obtain the data protection policy, a repository of potential data protection policies (e.g., a policy list) may be filtered based on the allocable computing resources and the intent based data protection request to identify a data protection policy. The system control processor manager may filter potential data protection policies based on the allocable computing resources and the intent based data protection request using the data protection policy repository and the telemetry data map. As discussed above, the intent based data protection request may specify a desired outcome to be provided by the composed information handling system.

The system control processor manager may first filter the data protection policies of the data protection policy repository to identify the data protection policies that specify data protection services associated with the desired outcome of the intent based data protection request. Additionally, data protection services specified by the first filtered data protection policies may require varying amounts of resources to perform the data protection services. The resource requirements may be specified by the data protection policies and/or the intent based data protection request. The system control processor manager may further filter the data protection policies to identify data protection policies that may be implemented using the allocable computing resources identified in step 502. The system control processor manager may identify one of the filtered data protection policies as the identified data protection policy (e.g., one of the policies for which sufficient allocable computing resources are present). The available data protection policies may be filtered based on the allocable computing resources and the intent based data protection request to identify the data protection policy via other and/or additional methods without departing from the invention.

In step 506, a data protection architecture is obtained based on the data protection policy, the allocable computing resources, and the intent based data protection request.

The system control processor manager may filter potential data protection architectures (e.g., stored in a repository like the list of data protection policies) based on the allocable computing resources and the data protection policy using the telemetry data map.

As discussed above, the telemetry data map may include characteristics and properties associated with the allocable computing resources. The data protection architectures of the data protection architecture lookup table may be filtered based on the allocable computing resources. The system control processor manager may identify data protection architectures of the data protections architectures that include or specify all or a portion of the allocable computing resources.

Additionally, data protection services specified by the data protection policy may require varying amounts of resources to perform the data protection services. The resource requirements may be specified by the data protection policies and/or the intent based data protection request. The system control processor manager may further filter the data protection architectures to identify data protection architectures that include or specify necessary resources to perform the data protection services specified by the data protection policy. The system control processor manager may identify one of the filtered data protection architectures as the identified data protection architecture. The available data protection architectures may be filtered based on the allocable computing resources and data protection policy to identify the data protection architecture via other and/or additional methods without departing from the invention.

In step 508, the data protection architecture is instantiated to obtain a composed information handling system to service the intent based data protection request. The data protection architecture may be instantiated via the method depicted in FIG. 5.2 without departing from the invention.

The method may end following step 508.

Using the method illustrated in FIG. 5.1, a data protection architecture may be instantiated using computing resources from one or more information handling systems and/or external resources to provide a desired outcome (e.g., data protection) specified by the intent based data protection request.

Following step 508 of FIG. 5.1, no applications may be presently executing on the composed information handling system. The composed information handling systems may then be turned over to other entities for management (e.g., orchestrators) or may be additionally managed by the system control processor manager by instructing the system control processors to load applications onto the composed information handling systems using any method without departing from the invention. For example, device images (e.g., data structures including information that may be used to instantiate one or more applications in corresponding operating states) may be used to begin execution of appropriate applications in desired states. By doing so, the composed information handling systems may begin to provide desired computer implemented services. Applications may be instantiated on a composed information handling system using other methods (e.g., performing first-time installations, copying binaries to storage and beginning execution of the binaries, etc.) without departing from the invention.

By virtue of the execution of these applications, the composed information handling systems may begin to generate valuable data. The data, when stored, may be provided with data protection services by the data protection architecture in a manner that is transparent to the applications.

Concurrently with or following the steps illustrated in FIG. 5.1, the composed information handling system data (314, FIG. 3) and resource map (316, FIG. 3) may be updated to reflect that various resources have now been allocated and are no longer available for allocation. For example, the resource map (316, FIG. 3) may be updated to indicate that the various hardware/virtualized devices being utilized to present bare metal resources to the composed information handling system are now allocated and unavailable (at least in part if virtualized) for allocation to present bare metal resources to other composed information handling systems. The resource maps maintained by the system control processor manager may be similarly updated.

Turning to FIG. 5.2, FIG. 5.2 shows a flowchart of a method of instantiating a composed information handling system using a data protection architecture in accordance with one or more embodiments of the invention. The method of FIG. 5.2 may be performed to identify available resources specified by the data protection architecture, setup management services based on a data protection policy, and instantiate the resources to obtain a composed information handling system. The method shown in FIG. 5.2 may be performed by, for example, a system control processor manager (e.g., 50, FIG. 1.1). Other components of the system in FIG. 1.1 may perform all, or a portion, of the method of FIG. 5.2 without departing from the invention.

While FIG. 5.2 is illustrated as a series of steps, any of the steps may be omitted, performed in a different order, additional steps may be included, and/or any or all of the steps may be performed in a parallel and/or partially overlapping manner without departing from the invention.

In step 520, at least one compute resource set having resources meeting compute resource requirements specified by the data protection architecture is identified. The at least one compute resource set may be identified by matching the computing resources specified by the data protection architecture to at least one compute resource set having those resources using a telemetry data map (412, FIG. 4). The at least one compute resource set having compute resources may be identified based on the data protection architecture via other and/or additional methods without departing from the invention.

For example, the telemetry data map (412, FIG. 4) may specify a list of compute resource sets, identifiers of control resource sets that manage the listed compute resource sets, the hardware devices of the listed compute resource sets, and characteristics and information regarding the compute resource set (e.g., memory size, storage size). By matching the computing resources specified by the data protection architecture to the hardware devices specified in the list, the compute resource set corresponding to the listed hardware devices may be identified as the at least one compute resource set.

If no compute resource set includes all of the computing resources specified by the data protection architecture, multiple compute resource sets having sufficient hardware devices to meet the computing resources specified by the data protection architecture may be identified as the at least one compute resource set.

In step 522, the at least one hardware resource set having resources meeting compute resource requirements of the data protection architecture is identified. The at least one hardware resource set may be identified similarly to that described with respect to the identification of the at least one compute resource set of step 520. For example, the hardware resources requirements specified by the data protection architecture may be matched to hardware resource sets.

In step 524, management services are set up based on the data protection policy, the intent based data protection request, and the data protection architecture for the at least one hardware resource set using an at least one control resource set to obtain logical hardware resources. To setup the management services, the system control processor manager may cooperate with the at least one control resource set. For example, the system control processor manager may generate instructions for implementing the management services, encapsulate the instructions in a message, and send the message to one or more system control processors of the at least one control resource set. In response to receiving the message, the system control processors may implement the instructions thereby implementing any number of management services such as backup generation, duplicative storage, error code correction, RAID, virtualization, emulation, etc.

The system control processor manager may also include identification information for the system control processors that will cooperate in presenting resources as part of instantiating a composed information handling system. Consequently, the system control processors of control resource sets that will facilitate bare metal presentation of resources to processors of compute resource sets of the composed information handling system may be able to identify each other, communicate with one another, etc.

Setting up management services for the hardware resource set may include, for example, preparing translation, indirection, or abstraction tables used to translate logical addresses provided by compute resource sets to physical addresses utilized by hardware devices of the hardware resource set.

In another example, setting up management services may include, if the type of the resource allocation is a portion of a virtualized resource, making a call to a virtualization resources manager to allocate the portion of resources from an existing virtualized resource or by instantiating a new virtualized resource and allocating the portion from the new virtualized resource.

In a still further example, if the type of the resource allocation requires an emulated resource, providing management services may include instantiating a corresponding emulation layer between a hardware device of the hardware resource set and the compute resource set. Consequently, bare metal communications between the compute resource set and the hardware device used to present the bare metal resource to the compute resource set may be automatically translated by the system control processor.

Setting up management services may further include modifying the operation of one or more devices to provide data protection functionality specified by the data protection policy. Other functionalities may include, for example, data integrity functionality (e.g., RAID, ECC, etc.), security functionality (e.g., encryption), and/or other functionalities that are transparent to the composed information handling system. For example, the system control processor manager may instantiate a backup generation application hosted by a system control processor of the at least once control resource set to generate backups of data obtained from the compute resource set. The system control manager may modify the operation of one or more devices to provide data protection functionality and other functionality via other and/or additional methods without departing from the invention. For additional information regarding setting up management services, refer to FIG. 5.3.

In step 526, the logical hardware resources are presented to the at least one compute resource set as bare metal resources using the at least one control resource set to instantiate the composed information handling system to service the intent based data protection request.

To present the logical hardware resources, the system control processor manager may instruct the system control processors of the at least control resource set to make the bare metal resources discoverable. For example, the at least one control resource set may send a bare metal communication to one or more processors of the at least one compute resource set to cause the processors to discover the presence of the presented bare metal resources. By doing so, the processors may then begin to utilize the logical hardware resources as bare metal resources resulting in a composed information handling system having all of the resources necessary to provide desired computer implemented services.

The method may end following step 526.

Using the method illustrated in FIG. 5.2, management services, including data protection services specified by a data protection policy, may be setup by preparing the at least one control resource set and the at least one hardware resource set to be presented to the compute resource set as logical hardware resources, and preparing the at least one control resource set and the at least one hardware resource set to provide data protection services for the composed information handling system.

Turning to FIG. 5.3, FIG. 5.3 shows a flowchart of a method of setting up management services in accordance with one or more embodiments of the invention. The method of FIG. 5.3 may be performed to allocate and prepare available resources specified by the data protection architecture to pools that each perform sets of functionalities of the data protection services. The method shown in FIG. 5.3 may be performed by, for example, a system control processor manager (e.g., 50, FIG. 1.1). Other components of the system in FIG. 1.1 may perform all, or a portion, of the method of FIG. 5.3 without departing from the invention.

While FIG. 5.3 is illustrated as a series of steps, any of the steps may be omitted, performed in a different order, additional steps may be included, and/or any or all of the steps may be performed in a parallel and/or partially overlapping manner without departing from the invention.

In step 530, computing resources to be allocated to pools that provide sets of functionalities of the data protection services are identified based on the data protection architecture. As discussed above, the allocable resources included in the data protection architecture may include at least one compute resource set, at least one control resource set, and at least one hardware resource set. Each allocable resource may include a set of functionalities that may be different from the other allocable resources. For example, a compute resource of the at least one compute resource set may include the functionality to perform heavy compute workloads, a hardware resource of the at least one hardware resource set may include the functionality to perform heavy storage workloads, and a control resource of the at least one control resource set may include the functionality to perform light compute workloads and light storage workloads. Heavy workloads may refer to workloads that require a significant amount of computing resources to perform and light workloads may refer to workloads that do not require a significant amount of resources to perform. Based on the functionalities of the allocable resources, the system control processor manager may identify pools that include sets of allocable resources. Each pool may perform a specific set of functionalities depending on the allocable resources included in the pool. The system control processor manager may identify pools that satisfy the data protection services specified by the data protection policy and the intent based data protection request. The system control processor manager may identify any number of pools with each pool including any number of allocable resources without departing from the invention. Computing resources to be allocated to pools that provided sets of functionalities of the data protection services are identified based on the data protection architecture.

For example, the system control processor manager may identify three pools of allocable computing resources. The first pool may include multiple compute resources of the at least one compute resource set. The first pool may include the functionality to perform heavy compute workloads (e.g., compression, garbage collection, etc.). The second pool may include multiple control resources of the control resource set. The second pool may include the functionality to perform light compute and storage workloads (e.g., deduplication, buffering, etc.). The third pool may include multiple control resources of the control resource set and multiple hardware resources of the at least one hardware resource set. The third pool may include the functionality to perform heavy storage workloads such as long term storage.

In step 532, sets of functionalities of the data protection services are assigned to the pools based on the computing resources of the pools. The performance of each set of functionalities of the data protection services may require different amounts and types of computing resources. The data protection policy and/or the intent based data protection request may specify the requirements associated with each set of functionalities of the data protection services. The system control processor manager may assign the sets of functionalities of the data protection services to the pools that include the functionality and the required computing resources to perform the sets of functionalities of the data protection services. Sets of functionalities of the data protection services may be assigned to the pools based on the computing resources of the pools via other and/or additional methods without departing from the invention.

Continuing with the example discussed above in step 530, the first pool may include allocable resources with the functionality to perform heavy compute workloads, the second pool may include allocable resources with the functionality to perform light compute and storage workloads, and the third pool includes allocable resources with the functionality to perform heavy storage workloads. The data protection policy associated with data protection architecture specifies that the data protection services include the following sets of functionalities: compression, deduplication and buffering, and long term storage. The system control processor manager may identify that compression is a heavy compute workload, deduplication and buffering are light compute and storage workloads respectively, and long term storage is a heavy storage workload. Therefore, the system control processor manager may assign the compression set of functionalities of the data protection services to the first pool, the deduplication and buffering set of functionalities to the second pool, and long term storage to the third pool.

In step 534, computing resources of the pools are prepared to perform the sets of functionalities of the data protection services based on the assignments. Computing resources of the pools may be prepared to perform the sets of functionalities of the data protection services based on the assignments via all, or a portion, of the methods discussed above in step 524 of FIG. 5.2. The system control processor manager may also initiate the instantiation of one or more applications on computer resources of the pools that provides the set of functionalities of the data protection services assigned to the pools. For example, device images (e.g., data structures including information that may be used to instantiate one or more applications in corresponding operating states) may be sent, by the system control processor manager, to the computing resources of the pools that may be used to begin execution of appropriate applications in desired states. By doing so, the computing resources of the pools may begin to provide desired data protection services. Applications may be instantiated on a computing resources of the pools using other methods (e.g., performing first-time installations, copying binaries to storage and beginning execution of the binaries, etc.) without departing from the invention. The computing resources of the pool may be prepared to perform the sets of functionalities of the data protection services based on the assignments via other and/or additional methods without departing from the invention.

The method may end after step 534.

Using the method of FIG. 5.3, pools of computing resources may be identified and prepared to perform data protection services, resulting in composed information handling systems with specialized data protection architectures. Each pool may be used to perform specific sets of functionalities of the data protection services in an efficient manner.

Turning to FIG. 5.4, this figure shows a flowchart of a method in accordance with one or more embodiments of the invention. The method depicted in FIG. 5.4 may be performed to provide data protection services for a composed information handling system in accordance with one or more embodiments of the invention. The method shown in FIG. 5.4 may be performed by, for example, a system control processor (e.g., 114, FIG. 1.1) of an information handling system (e.g., 62, FIG. 1.1). Other components of the system in FIG. 1.1 may perform all, or a portion, of the method of FIG. 5.43 without departing from the invention.

While FIG. 5.4 is illustrated as a series of steps, any of the steps may be omitted, performed in a different order, additional steps may be included, and/or any or all of the steps may be performed in a parallel and/or partially overlapping manner without departing from the invention.

Prior to step 540, a composed information handling system, including a system control processor, was instantiated based on an intent based data protection request via the methods of FIGS. 5.1-5.3 discussed above. The intent based data protection request may indicate that data protection services are to be implemented for applications executing on the at least one control resource set of the composed information handling system based on a data protection policy. The data protection services may include generating backups of data obtained from the at least one compute resource set. The data protection services may include other and/or additional services and may be implemented via other and/or additional methods without departing from the invention.

In step 540, a bare metal communication associated with data protection services is obtained. A compute resource of the compute resource set of the composed information handling system may send a message to the storage control processor. The message may include the bare metal communication. The bare metal communication may indicate that data is to be written to and stored in one or more hardware resources of the hardware resource set. The bare metal communication may also specify a storage resource of the hardware resource set of the composed information handling system in which to write and store the data. The message may also include the data that is to be written to and stored in one or more hardware resources of the hardware resource set. The bare metal communication associated with the data protection service may be obtained via other and/or additional methods without departing from the invention.

Additionally, the bare metal communication may indicate an occurrence of a backup trigger event indicating that a backup is to be generated of the data. The backup trigger event may be that a data protection policy obtained from the system control processor manager or another component indicates that a backup of the data is to be generated. A data protection policy may be a data structure that includes events and/or conditions which, when identified by the system control processor, indicate that a backup of data is to be generated. The data protection policy may specify (i) a period of time elapsing after which a backup of the data is to be generated, (ii) a point in time to generate a backup of the data, (iii) the occurrence of a condition precedent such as modification of the resources of the composed information handling system of which a backup of the data is to be generated, and (iv) any other event and/or condition that may result in the generation of a backup of the data without departing from the invention. The backup trigger event may include other events identified by the system control processor or another component of the system depicted in FIG. 1.1 without departing from the invention.

In step 542, a first portion of a set of functionalities of the data protection services is performed based on the bare metal communication using the at least one control resource set and the at least one hardware resource set of the composed information handling system. A system control processor may be a control resource of the at least one control resource set of the composed information handling system that is included in a first pool that provides the first portion of a set of functionalities of the data protection services. The first portion of the set of functionalities of the data protection services may include generating a backup of the data. The first portion of the set of functionalities of the data protection services may include other and or additional data protection services (e.g., deduplication, replication, etc.) without departing from the invention. In response to obtaining the bare metal communication, the system control processor, or an entity executing on the system control processor, may perform the first portion of the set of functionalities of the data protection services. The system control processor may generate a backup of the data associated with the bare metal communication. The backup may be a snapshot of the data, the backup may be other types of backups without departing from the invention. The system control processor may write the original data to a storage resource of the hardware resource set. The system control processor may use and/or invoke the functionality of the physical resources manager, emulated resources manager, and/or the virtual resources manager to write the original data to the storage resource. The system control processor may use address tables and/or other resources generated using the physical resources manager, emulated resources manager, and/or the virtual resources manager to write the first copy of data to the storage resource. As a result, the original data may be stored in the storage resource of the hardware resource set of the composed information handling system. The first portion of the set of functionalities of the data protection services may be performed based on the bare metal communication using the at least one control resource set.

In step 544, performance of a second portion of the set of functionalities of the data protection services using the at least one compute resource set is initiated. The system control processor may send a message to a compute resource of the compute resource set. The compute resource may be included in a second pool with the functionality to perform second portion of the set of functionalities of the data protection services. The second portion of the set of functionalities of the data protection services may include performing compression on backups. The message may include the backup and a request to perform the second portion of the set of functionalities of the data protection services using the at least one compute resource set. In response to obtaining the message, a compression application executing on a compute resource of the compute resource set compresses the backup to obtain a compressed backup. The compute resource may write the compressed backup to a backup storage, where the compressed backup is stored in persistent storage of the backup storage. The second portion of the set of functionalities of the data protection services may include other and/or additional data protection services and may be perform by other and/or additional computing resources of other and/or additional pools without departing from the invention.

The method may end following step 544.

Using the method illustrated in FIG. 5.4, data protection services may be performed for a composed information handling system. The data protection services may be transparent to at least a portion of applications executing on the compute resource set of the composed information handling system. Consequently, the data protection services provided by the system control processor may be performed without interrupting and/or hindering the computer implemented services provided by the applications executing the compute resource set of the composed information handling system. Therefore, the efficiency of the performance of the composed information handling system and the protection of data generated by the composed information handling system may be improved.

Turning to FIG. 5.5, this figure shows a flowchart of a method in accordance with one or more embodiments of the invention. The method depicted in FIG. 5.5 may be performed to recompose a composed information handling system in accordance with one or more embodiments of the invention. The method shown in FIG. 5.5 may be performed by, for example, a system control processor manager (e.g., 50, FIG. 1.1). Other components of the system in FIG. 1.1 may perform all, or a portion, of the method of FIG. 5.5 without departing from the invention.

While FIG. 5.5 is illustrated as a series of steps, any of the steps may be omitted, performed in a different order, additional steps may be included, and/or any or all of the steps may be performed in a parallel and/or partially overlapping manner without departing from the invention.

Prior to step 550, a composed information handling system, including a system control processor, was instantiated based on an intent based data protection request via the methods of FIGS. 5.1-5.3 discussed above.

In step 550, a recomposition event is identified. A recomposition event may be an event or condition that indicates a composed information handling system is to be recomposed. As used herein, recomposing a composed information handling system may include modifying the resources allocated to a composed information handling system and/or modifying the functionality of resources allocated to a composed information handling system. The recomposition event may include, for example, obtaining a request from a component of the system to recompose a composed information handling system that did not fully meet data protection requirements, a period of time elapsing after which a composed information handling system is to be recomposed, the occurrence of a condition precedent such as modification of the resources of the composed information handling system in which a composed information handling system is to be recomposed, newly available allocable resources are identified, and any other event and/or condition that may result in the recomposition of a composed information handling system without departing from the invention. The system control processor manager may monitor the composed information handling system and/or other entities to identify recomposition events. The recomposition event may specify the composed information handling system that is associated with the recomposition event. A recomposition event may be identified via other and/or additional methods without departing from the invention.

In step 552, the data protection policy and the data protection architecture are modified based on the change of computing resources of the recomposed information handling system. The system control processor manager may modify the data protection policy and data protection architecture of the composed information handling system using the intent based data protection request used to instantiate the composed information handling system and the available resources at the point in time of the identification of the recomposition event. The system control processor manager may modify the data protection policy and the data protection architecture of the composed information handling system via the methods illustrated in FIGS. 5.1-5.3 without departing from the invention.

The method may end following step 552.

Using the method illustrated in FIG. 5.5, composed information handling systems may be dynamically recomposed. The recomposed information handling system may include a modified data protection policy and data protection architecture. Consequently, the recomposed information handling system may result in an optimized composed information handling system to improve the efficiency of the operation of the composed information handling system while maintaining desired data protection services.

To further clarify embodiments of the invention, a non-limiting example is provided in FIGS. 6.1-6.4. FIGS. 6.1 and 6.4 show a system similar to that illustrated in FIG. 1.1. Actions performed by components of the illustrated system are illustrated by numbered, circular boxes interconnected, in part, using dashed lines. For the sake of brevity, only a limited number of components of the system of FIG. 1.1 is illustrated in FIGS. 6.1 and 6.4. FIGS. 6.2-6.3 show diagrams of examples of data structures utilized by the example system of FIGS. 6.1 and 6.4.

EXAMPLE

Consider a scenario as illustrated in FIG. 6.1 in which a client (602), at step 1, sends an intent based data protection request to a system control processor manager (600) that manages two information handling systems, information handling system A (610) and information handling system B (620). The intent based data protection request specifies that a composed information handling system is to be instantiated to include data protection functionality specified by the intent based data protection request. The intent based data protection request may specify that data generated by the composed information handling system is to be backed up, and the backup is to be deduplicated, compressed, and stored in long term storage for restoration purposes.

In response to obtaining the intent based data protection request, the system control processor manager (600), at step 2, identifies a data protection policy and a data protection architecture associated with the intent based data protection request based on available (i.e., allocable) resources using the data structures in FIGS. 6.2-6.4. As seen in FIG. 6.2, the telemetry data map (640) includes entries (e.g., 642, 652) associated with information handling system A (610) and information handling system B (620).

The information handling system entries (642, 652) are used by the system control processor manager (600) to ascertain the available resources of the information handling system (610) that may be used to instantiate the composed information handling system. For example, the information handling system A entry (642) specifies that a compute resource set including a processor and memory (644), a control resource set including a system control processor (648), and a hardware resource set (650) including a solid state disk are available resources of information handling system A (610). Additionally, the information handling system B entry (652) specifies that a compute resource set including a processor and memory (654), a control resource set including a system control processor (656), and a hardware resource set (658) including a solid state disk are available resources of information handling system B (620). The system control processor manager (600) uses the information handling system entries (642, 652) of the telemetry data map (640) to identify the aforementioned resources as available resources.

As seen in FIG. 6.3, the data protection architecture lookup table (670) includes an entry (e.g., 672) that specify the resource sets and corresponding hardware devices of these resource sets that may be associated with a data protection policy specified by the intent based data protection request. The system control processor manager may use the available resources identified using FIG. 6.2 and the data protection policy to identify a data protection architecture that includes the available resources to use to instantiate the composed information handling system and may be used to perform the data protection services specified by the data protection policy. For example, the data protection architecture lookup table (670) includes a data protection architecture A entry (672) which specifies compute resources that include a processor and one gigabyte of memory that include a compression application (674), control resources that include a backup generation and deduplication application (676), and hardware resources that include one terabyte of long term storage space and ten gigabytes of buffer storage (678).

Returning to FIG. 6.1, based on the information included in the tables illustrated in FIGS. 6.2-6.3, the system control processor manager (600), at step 3, determines that a composed information handling system should be instantiated utilizing compute resource set A (612) of information handling system A (610), system control processor A (614) of information handling system A (610), solid state disk A (616) of information handling system A (610), system control processor B (624) of information handling system B (620), and solid state disk B (626) of information handling system B (620). Compute resource set B (622) of information handling system B (620) is determined not to be used in the composed information handling system.

Additionally, the system control processor manager (600) identifies three pools of computing resources to perform three portions of the data protection services based on the intent based data protection request and the aforementioned computing resources. The first pool includes system control processor A (614) and solid state disk A (616) of information handling system A (610). The system control processor manager (600) determines the first pool performs the backup generation, deduplication, and buffering portions of the data protection services. The second pool includes compute resource set A (612) of information handling system A (610). The system control processor manager (600) determines that the second pool performs the compression portion of the data protection services. The third pool includes system control processor B (624) and solid state disk B (626) of information handling system B (620). The system control processor manager (600) determines that the third pool performs the long term storage portion of the data protection services.

Based on the determinations, a message, at step 4, indicating these resources of the information handling system (610) is sent to system control processor A (614). The message indicates that the aforementioned resources and to be allocated to the composed information handling system as three pools and the three pools are to perform the aforementioned portions of data protection services as discussed above.

In response to the first message, at step 5, system control processor A (614) determines that ten gigabytes of solid state disk A (616) should be presented by virtualizing ten gigabytes of solid state disk A (616) as the buffer storage (see, FIG. 6.4). System control processor A (614) generates an appropriate address translation table associated with ten gigabytes of solid state disk A (616) to present the ten gigabytes of storage of solid state disk A (616) as the buffer storage. At step 6, system control processor A (614) uses the appropriate address table to obtain the buffer storage from solid state disk A (616).

At step 7, system control processor A (614) determines that it is included in the first pool and must perform the backup generation and deduplication portion of the data protection services. Accordingly, the system control processor (614) instantiates a backup generation and deduplication application (630) (see, FIG. 6.4) that generates backups of data written to the buffer storage, and deduplicates backups as specified in FIG. 6.3. Following the instantiation of the backup generation and deduplication application (630), at step 8, system control processor A (624) determines that, based on the message from the system control processor manager (600), system control processor B (624) and solid state disk B (626) are to be allocated to the composed information handling system. In response to the determination, at step 9, system control processor A (614) sends a message to system control processor B (624) indicating the aforementioned resource allocation.

In response to the message obtained from system control processor A (614), at step 10, system control processor B (624) determines that one terabyte of solid state disk B (626) should be presented by virtualizing one terabyte of solid state disk B (626) as the long term storage (see, FIG. 6.4). System control processor B (624) generates an appropriate address translation table associated with one terabyte of solid state disk B (626) to present the one terabyte of storage of solid state disk B (626) as the long term storage. At step 11, system control processor B (624) uses the appropriate address table to obtain the long term storage from solid state disk B (626).

After that, at step 12, system control processor A (614) determines that, based on the message from the system control processor manager (600), compute resource set A (612) is to perform the compression portion of the data protection services. Based on the determination, at step 13, system control processor A sends a message to compute resource set (612) initiating the instantiation of a compression application on the processor of compute resource set A (612). The message also presents the buffer storage and long term storage as bare metal resources. In response to obtaining the message, the processor of compute resource set A (614) instantiates a compression application (see, FIG. 6.4) and the composed information handling system is obtained.

Turning to FIG. 6.4, the composed information handling system has been obtained. The resources of the composed information handling system have been divided into three pools as discussed above. The first pool, pool A (660), includes system control processor A (614A) and solid state disk A (616). Pool A (660) performs the backup generation and deduplication portion of the data protection services using the backup generation and deduplication application (630) executing on system control processor A (614) and the buffering portion of the data protection services using solid state disk A (616). The second pool, pool B (662), includes compute resource set A (612) and performs the compression portion of the data protection services using the compression application (636) executing on a processor of compute resource set A (612). The third pool, pool C (664), includes system control processor B (624) and solid state disk B (626). Pool C (664) performs the long term storage portion of the data protection services using system control processor B (624) and the long term storage (634) of solid state disk B (626).

At step 14, applications executing on compute resource set A (612) generate data. Consequently, at step 15, compute resource set A (612) sends a message to system control processer A (614) that includes the generated data and a bare metal communication indicating that the data is to be stored.

At step 16, based on the bare metal communication, system control processor A (614) writes the data to the buffer storage (632). At step 17, the data is stored in buffer storage (632). Following the storage of the data in buffer storage (632), at step 18, the backup generation and deduplication application (630) obtains the data, generates a backup of the data and performs deduplication on the backup to obtain deduplicated data. At step 19, the deduplicated data is sent to the compression application (636). After obtaining the deduplicated data, the compression application (636) performs compression on the deduplicated data to obtain compressed, deduplication data. After obtaining the compressed, deduplication data, at step 20, the compression application sends the compressed, deduplicated data to system control processor B (624). Once the compressed, deduplicated data is obtained, at step 21, system control processor B (624) sets a long term retention period specifying the amount of time the compressed, deduplicated data is to be stored in the long term storage (634). At step 22, system control processor B (624) writes the compressed, deduplicated data to the long term storage (634). At step 23, the compressed, deduplicated data is stored in the long term storage (634) according to the long term retention period.

End of Example

Thus, as illustrated in FIGS. 6.1-6.4, embodiments of the invention may provide a system that enables improved data protection services to be provided using pools of resources allocated by the system control processor manager by instantiating composed information handling systems based on available resources, data protection policies, and data protection architectures via efficient computing resource allocation to perform data protection services.

Figure 7:
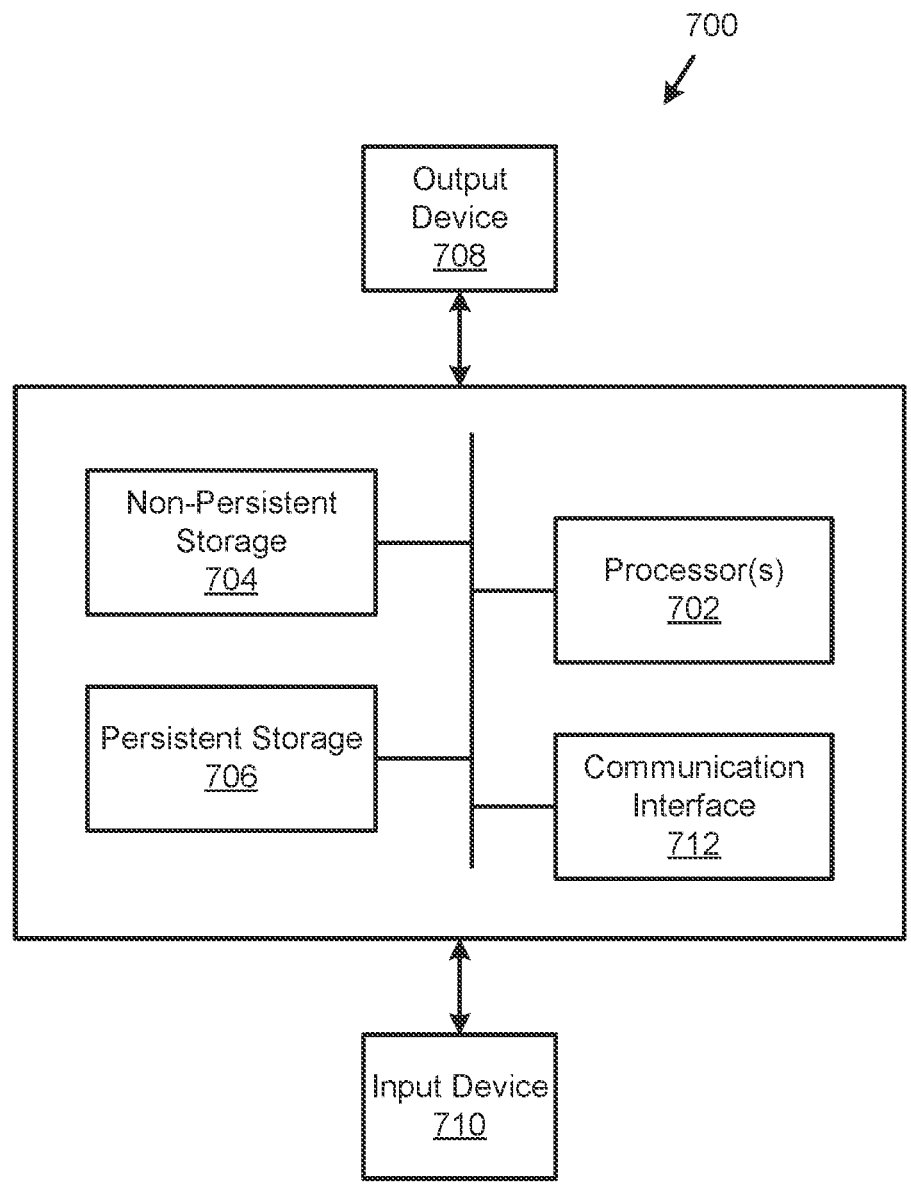
FIG. 7 shows a diagram of a computing device in accordance with one or more embodiments of the invention.

As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may provide a system and method for instantiating composed information handling systems with specialized data protection architectures. Specifically, embodiments of the invention may provide a system control processor manager which instantiates composed information handling systems based on intent based data protection requests. The system control processor manager may identify allocable resources, and based on the available resources, identify a data protection policy and a data protection architecture to instantiate a composed information handling system to service the intent based data protection request. The system control processors may, based on the computing resources included in the data protection architecture, identify pools of computing resources and assign sets of functionalities of data protection services to the pools based on the computing resources of each pool. Each pool may perform a set of the functionalities of the data protection services based on the assignments of the system control processor manager. The performance of the data protection services may be transparent to at least a portion of the compute resource sets of the composed information handling systems and may not interfere with and/or hinder the computer implemented services provided by the compute resource sets.

Thus, embodiments of the invention may address the problem of performing data protection services for composed systems. For example, by utilizing a system control processor manager to instantiate a composed information handling system with pools of computing resources that each perform a set of the functionalities of the data protection services based on the functionalities of the computing resources included in the pools, the composed information handling system may be instantiated with a specialized data protection architecture that improves the efficiency of the performance of data protection services for composed information handling systems.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A system for providing data protection services for data generated by applications hosted by composed information handling systems, the system comprising:
    persistent storage; and
    a computing device, comprising a processor and memory, programmed to:
        obtain a data protection architecture from a data protection architecture lookup table to provide the data protection services for the data generated by the applications based on a data protection policy and allocable computing resources, using a telemetry data table, wherein:
            the data protection architecture specifies computing resources required to perform the data protection services specified by the data protection policy, and
            the data protection services comprise backup generation, erasure coding, compression, garbage collection, buffering, long term storage, deduplication, and replication;
        identify, based on the data protection architecture, first computing resources to be allocated to a first pool that provides a first portion of the data protection services;
        identify, based on the data protection architecture, second computing resources to be allocated to a second pool that provides a second portion of the data protection services, wherein:
            the second portion of the data protection services comprises heavy storage workloads, and
            a first portion of the second computing resources comprises a hardware resource set;

identify a level of compute and storage workloads associated with each of the data protection services;

assign, based on hardware components of the first computing resources and the level, a first sub-portion of the first portion of the data protection services to a first portion of the first computing resources, wherein the first sub-portion of the first portion of the data protection services includes at least one of backup generation, compression, and garbage collection;

assign, based on the hardware components of the first computing resources and the level, a second sub-portion of the first portion of the data protection services to a second portion of the first computing resources, wherein the second sub-portion of the first portion of the data protection services includes long term storage;

instantiate, based on the assignments, the data protection architecture to obtain composed information handling systems to provide the data protection services;

monitor, in response to the instantiating, the composed information handling systems;

identify, based on the monitoring, a recomposition event occurring in at least one information handling system of the information handling systems; and modify, based on the recomposition event, the data protection policy and the data protection architecture.

2. The system of claim 1, wherein the first portion of the data protection services comprises heavy compute workloads, wherein the first portion of the first computing resources comprises a compute resource set.

3. The system of claim 1, wherein the first portion of the data protection services comprises minimal compute workloads, wherein the second portion of the first computing resources comprises a control resource set.

4. The system of claim 1, wherein the computing device is further programmed to:

assign, based on hardware components of the second computing resources, a first sub-portion of the second portion of the data protection services to the first portion of the second computing resources; and assign, based on the hardware components of the second computing resources, a second sub-portion of the second portion of the data protection services to a second portion of the second computing resources.

5. The system of claim 1, wherein the first portion of the data protection services comprises minimal compute workloads, wherein a first portion of the first computing resources comprises a control resource set.

6. The system of claim 1, wherein instantiating, based on the assignments, the data protection architecture to obtain composed information handling systems comprises:

instantiating a first composed information handling system comprising the first computing resources that provide the first portion of the data protection services;

instantiating a second composed information handling system comprising the second computing resources that provide the second portion of the data protection services; and flowing data through the first composed information handlings system and the second composed information handling system to provide the data protection services.

7. The system of claim 6, wherein the data protection services further comprise:

deduplicating the data by the first composed information handling system to obtain deduplicated data;

buffering the deduplicated data by the second composed information handling system; and storing the buffered deduplicated data in long term storage.

8. The system of claim 6, wherein instantiating the first composed information handling system comprises:

identifying, based on the data protection architecture and the assignments, at least one compute resource set of the first computing resources having computer resources meeting compute resource requirements of the data protection architecture and the assignments;

identifying, based on the data protection architecture and the assignments, at least one hardware resource set of the first computing resources having computer resources meeting the compute resource requirements of the data protection architecture and the assignments; and setting up management services based on a data protection policy and the data protection architecture for the hardware resource set using at least one control resource set to obtain logical hardware resources; and providing the logical hardware resources using the at least one control resource set to the at least one compute resource set as bare metal resources to instantiate the first composed information handling system.

9. The system of claim 8, wherein setting up management services comprises: preparing the at least one compute resource set to perform the first sub-portion of the first portion of the data protection services; and preparing the at least one control resource set to perform the second sub-portion of the first portion of the data protection services.

10. The system of claim 9, wherein preparing the at least one control resource set comprises:

instantiating a first data protection application, hosted by a system control processor of the at least one control resource set, that:

after the first composed information handling system is instantiated:

obtains an IO request associated with the data protection services;

performs the second sub-portion of the first portion of the data protection services; and initiates performance of the first sub-portion of the first portion of the data protection services.

11. The system of claim 10, wherein preparing the at least one compute resource set comprises:

instantiating a second data protection application, hosted by a processor of the at least one compute resource set, that:

after performance of the second sub-portion of the first portion of the data protection services is initiated:

performs the first sub-portion of the first portion of the data protection services.

12. A method for providing data protection services for data generated by applications hosted by composed information handling systems, comprising:

obtaining a data protection architecture from a data protection architecture lookup table to provide the data protection services for the data generated by the applications based on a data protection policy and allocable computing resources, using a telemetry data table, wherein:

the data protection architecture specifies computing resources required to perform the data protection services specified by the data protection policy, and the data protection services comprise backup generation, erasure coding, compression, garbage collection, buffering, long term storage, deduplication, and replication;

identifying, based on the data protection architecture, first computing resources to be allocated to a first pool that provides a first portion of the data protection services;

identifying, based on the data protection architecture, second computing resources to be allocated to a second pool that provides a second portion of the data protection services, wherein:

the second portion of the data protection services comprises heavy storage workloads, and a first portion of the second computing resources comprises a hardware resource set;

identifying a level of compute and storage workloads associated with each of the data protection services;

assigning, based on hardware components of the first computing resources and the level, a first sub-portion of the first portion of the data protection services to a first portion of the first computing resources, wherein the first sub-portion of the first portion of the data protection services includes at least one of backup generation, compression, and garbage collection;

assigning, based on the hardware components of the first computing resources and the level, a second sub-portion of the first portion of the data protection services to a second portion of the first computing resources, wherein the second sub-portion of the first portion of the data protection services includes long term storage;

instantiating, based on the assignments, the data protection architecture to obtain composed information handling systems to provide the data protection services;

monitoring, in response to the instantiating, the composed information handling systems;

identifying, based on the monitoring, a recomposition event occurring in at least one information handling system of the information handling systems; and modifying, based on the recomposition event, the data protection policy and the data protection architecture.

13. The method of claim 12, wherein the first portion of the data protection services comprises heavy compute workloads, wherein the first portion of the first computing resources comprises a compute resource set.

14. The method of claim 12, wherein the first portion of the data protection services comprises minimal compute workloads, wherein the second portion of the first computing resources comprises a control resource set.

15. The method of claim 12, further comprising:

assigning, based on hardware components of the second computing resources, a first sub-portion of the second portion of the data protection services to the first portion of the second computing resources; and assigning, based on the hardware components of the second computing resources, a second sub-portion of the second portion of the data protection services to a second portion of the second computing resources.

16. A non-transitory computer readable medium comprising computer readable program code, which when executed by a computer processor enables the computer processor to perform a method for providing data protection services for data generated by control plane applications hosted by composed information handling systems, the method comprising:

obtaining a data protection architecture from a data protection architecture lookup table to provide the data protection services for the data generated by the 8 applications based on a data protection policy and allocable computing resources, using a telemetry data table, wherein:

the data protection architecture specifies computing resources required to perform the data protection services specified by the data protection policy, and the data protection services comprise backup generation, erasure coding, compression, garbage collection, buffering, long term storage, deduplication, and replication;

identifying, based on the data protection architecture, first computing resources to be allocated to a first pool that provides a first portion of the data protection services;

identifying, based on the data protection architecture, second computing resources to be allocated to a second pool that provides a second portion of the data protection services, wherein:

the second portion of the data protection services comprises heavy storage workloads, and a first portion of the second computing resources comprises a hardware resource set;

identifying a level of compute and storage workloads associated with each of the data protection services;

assigning, based on hardware components of the first computing resources and the level, a first sub-portion of the first portion of the data protection services to a first portion of the first computing resources, wherein the first sub-portion of the first portion of the data protection services includes at least one of backup generation, compression, and garbage collection;

assigning, based on the hardware components of the first computing resources and the level, a second sub-portion of the first portion of the data protection services to a second portion of the first computing resources, wherein the second sub-portion of the first portion of the data protection services includes long term storage;

instantiating, based on the assignments, the data protection architecture to obtain composed information handling systems to provide the data protection services;

monitoring, in response to the instantiating, the composed information handling systems;

identifying, based on the monitoring, a recomposition event occurring in at least one information handling system of the information handling systems; and modifying, based on the recomposition event, the data protection policy and the data protection architecture.

17. The non-transitory computer readable medium of claim 16, wherein the first portion of the data protection services comprises heavy compute workloads, wherein the first portion of the first computing resources comprises a compute resource set.

18. The non-transitory computer readable medium of claim 16, wherein the first portion of the data protection services comprises minimal compute workloads, wherein the second portion of the first computing resources comprises a control resource set.

19. The non-transitory computer readable medium of claim 16, wherein the method further comprises:

assigning, based on hardware components of the second computing resources, a first sub-portion of the second portion of the data protection services to the first portion of the second computing resources; and assigning, based on the hardware components of the second computing resources, a second sub-portion of the second portion of the data protection services to a second portion of the second computing resources.

\* \* \* \* \*